US011951484B2

(12) United States Patent
Roska et al.

(10) Patent No.: US 11,951,484 B2
(45) Date of Patent: Apr. 9, 2024

(54) HAMMER FOR MATERIAL REDUCING MACHINES

(71) Applicant: ESCO GROUP LLC, Portland, OR (US)

(72) Inventors: Michael B. Roska, Portland, OR (US); Ty D. Porter, Oregon City, OR (US); Severn D. Durand, Portland, OR (US)

(73) Assignee: ESCO GROUP LLC, Portland, OR (US)

( * ) Notice: Subject to any disclaimer, the term of this patent is extended or adjusted under 35 U.S.C. 154(b) by 268 days.

(21) Appl. No.: 16/724,182

(22) Filed: Dec. 20, 2019

(65) Prior Publication Data

US 2020/0122152 A1 Apr. 23, 2020

Related U.S. Application Data

(62) Division of application No. 14/699,939, filed on Apr. 29, 2015, now Pat. No. 10,525,477.

(60) Provisional application No. 61/986,392, filed on Apr. 30, 2014.

(51) Int. Cl.
*B02C 13/04* (2006.01)
*B02C 13/28* (2006.01)

(52) U.S. Cl.
CPC .............. *B02C 13/04* (2013.01); *B02C 13/28* (2013.01); *B02C 2013/2812* (2013.01)

(58) Field of Classification Search
CPC ......... B02C 13/04; B02C 13/06; B02C 13/28; B02C 2013/2812
See application file for complete search history.

(56) References Cited

U.S. PATENT DOCUMENTS

| | | | |
|---|---|---|---|
| 1,363,189 | A | 12/1920 | Mulroney |
| 1,456,987 | A | 5/1923 | Lucas |
| 1,618,826 | A | 2/1927 | Hiller |
| 1,630,021 | A | 5/1927 | Lucas |
| 1,717,759 | A | 6/1929 | Briggs |
| 1,940,116 | A | 12/1933 | Brooks |
| 2,019,514 | A | 11/1935 | Stine |
| 2,183,880 | A | 12/1939 | Brooks |
| 2,318,219 | A | 5/1943 | Harris |
| 2,397,776 | A | 4/1946 | O'Fallon |
| 2,404,775 | A | 7/1946 | Ehmann |
| 2,531,597 | A | 11/1950 | Anderson |
| 2,534,301 | A | 12/1950 | Sennholtz |
| 2,534,302 | A | 12/1950 | Sennholtz |
| 2,566,758 | A | 9/1951 | Anderson |
| 2,568,077 | A | 9/1951 | Loufek |
| 2,605,972 | A | 8/1952 | Le Blanc |
| 2,620,989 | A | 12/1952 | Keiper |
| 2,663,505 | A | 12/1953 | Sennholtz |

(Continued)

FOREIGN PATENT DOCUMENTS

| | | |
|---|---|---|
| DE | 1163641 | 2/1904 |
| DE | 848006 | 9/1952 |

(Continued)

*Primary Examiner* — Faye Francis
(74) *Attorney, Agent, or Firm* — Steven Schad

(57) ABSTRACT

A multi-piece hammer for use in a reducing machine. The multi-piece hammer includes a base to be mounted to the reducing machine, a replaceable tip to be mounted to the base and to impact the material to be reduced, and a retainer to secure the replaceable tip to the base. The replaceable tip has a cavity with a single rail or groove that corresponds to a single groove or rail on the base.

16 Claims, 27 Drawing Sheets

(56) References Cited

U.S. PATENT DOCUMENTS

| | | | |
|---|---|---|---|
| 2,721,707 | A | 10/1955 | Reinhardt |
| 2,927,739 | A | 3/1960 | Sennholtz |
| 2,939,640 | A | 6/1960 | Whisler, Sr. |
| 2,950,066 | A | 8/1960 | Smith |
| 2,982,486 | A | 5/1961 | Ehmann |
| 3,104,838 | A | 9/1963 | Smith, Jr. |
| 3,179,344 | A | 4/1965 | Morel |
| 3,207,448 | A | 9/1965 | Miller |
| 3,236,463 | A | 2/1966 | Ratkowski |
| 3,262,646 | A | 7/1966 | Pollitz |
| 3,272,445 | A | 9/1966 | Weller |
| 3,367,585 | A | 2/1968 | Ratkowski |
| 3,379,384 | A | 4/1968 | Compagnoni |
| 3,503,562 | A | 3/1970 | Haberman |
| 3,545,691 | A | 12/1970 | Arsenault |
| 3,829,032 | A | 8/1974 | Schrimper |
| 3,901,452 | A | 8/1975 | Loevenich |
| 4,027,408 | A | 6/1977 | Ramella et al. |
| 4,046,327 | A | 9/1977 | Cranor |
| 4,049,202 | A | 9/1977 | Schmidt |
| 4,117,985 | A | 10/1978 | Lazareck |
| 4,202,504 | A | 5/1980 | Cameron |
| 4,352,774 | A | 10/1982 | Hornberger |
| 4,519,551 | A | 5/1985 | Ceurvorst |
| 4,826,090 | A | 5/1989 | Orphall |
| 5,114,085 | A | 5/1992 | Inui |
| 5,169,077 | A | 12/1992 | Stelk |
| 5,381,976 | A | 1/1995 | Chon et al. |
| 5,464,164 | A | 11/1995 | Doppstadt |
| 5,484,111 | A | 1/1996 | Dorscht et al. |
| 6,364,227 | B1 | 4/2002 | Dorscht |
| 6,375,106 | B1 | 4/2002 | Sears |
| 6,874,716 | B2 | 4/2005 | Heukamp et al. |
| 8,192,112 | B2 | 6/2012 | Turcot et al. |
| 9,327,287 | B2 | 5/2016 | Doppstadt et al. |
| 2012/0234953 | A1 | 9/2012 | Risi |
| 2013/0277476 | A1 | 10/2013 | Doppstadt et al. |

FOREIGN PATENT DOCUMENTS

| | | |
|---|---|---|
| DE | 1274423 | 8/1968 |
| EP | 240440 | 10/1987 |
| GB | 348736 | 5/1931 |

HAMMER FOR MATERIAL REDUCING MACHINES

RELATED APPLICATION

This application is a divisional of pending U.S. application Ser. No. 14/699,939, filed Apr. 29, 2015, now U.S. patent Ser. No. 10/525,477, entitled "Hammer for Material Reducing Machines," which claims priority to U.S. Provisional Patent Application No. 61/986,392, filed Apr. 30, 2014. Each of these applications are incorporated by reference herein in its entirety and made a part hereof.

FIELD OF THE INVENTION

The present invention relates to industrial material reducing systems. More particularly, this invention relates to shredding systems that include shredder hammers.

BACKGROUND OF THE INVENTION

Industrial shredding equipment typically is used to break large objects into smaller pieces that can be more readily processed. Commercially available shredders range in size from those that shred materials like sugar cane, rocks, clay, rubber (e.g., car tires), wood, and paper to larger shredding systems that are capable of shredding scrap metal, automobiles, automobile body parts, and the like.

FIG. 1 schematically illustrates an exemplary industrial shredding system 10*a*. As an example only, the system is shown shredding sugar cane. Shredding system 10*a* includes a material intake 12*a* (such as conveyor) that introduces material 14*a* to be shredded to a shredding chamber 16*a*. The material 14*a* to be shredded may be of any desired size or shape. The material 14*a* is optionally pretreated, such as by heating, cooling, crushing, baling, etc. before being introduced into the shredding chamber 16*a*. The material intake 12*a* may optionally include levelers 11*a*, feed rollers 13*a*, or other machinery to facilitate feeding material 14*a* to chamber 16*a*, and/or to control the rate at which material 14*a* enters chamber 16*a*, and/or to prevent the material 14*a* from moving backward on the conveyor 12*a*.

Because there are a wide variety of applications for shredding machines, from sugar cane processing to automobile shredding, there is a wide range and variety of shredder configurations. As examples, there are generally two types of shredders for processing sugar cane: vertical shredders and horizontal shredders. In a vertical shredder (FIG. 1), knives 15*a* may be used to initially break up the sugar cane so that the material is the appropriate size for the shredding process. A rotary shredding head 18*a* spins with a direction of rotation indicated by arrow 27*a* that is in-line with the direction of rotation of the conveyor 12*a*. Rotary shredding head 18*a* is configured to rotate about a shaft or axis 20*a*, and is equipped with a plurality of shredder hammers 22*a* to impact the sugar cane against a hardened surface 24*a* to break the material apart. The hardened surface may be, for example, the feed roller, an anvil, a grate, chamber walls, or adjacent hammers. In the illustrated example, hammers 22*a* work in cooperation primarily with chamber walls and grates. The rotary shredding head may have, for example, 50 to 200 hammers to break up the material. Each shredder hammer 22*a* is independently pivotally mounted to the rotary shredding head 18*a* with a mounting pin 26*a* (FIGS. 3 and 4). In response to centrifugal forces as shredding head 18*a* rotates, each hammer extends outward, tending toward a position where the center of gravity of each hammer is spaced outward as far as possible from rotation axis 20*a* when no material is in the chamber. The shredding chamber 16*a* may have one or more additional rotary shredding heads 18*a* to further break up the material. The shredded material may then be discharged onto another conveyor for transportation to further processing.

FIG. 2 shows one example of a horizontal shredder. In this embodiment of a horizontal shredder, a rotary shredding head 18*b* spins with a direction of rotation indicated by arrow 27*b*. Similar to the vertical shredder the horizontal shredder is equipped with a rotary shredding head 18*b* that is configured to rotate about a shaft or axis 20*b*, and is equipped with a plurality of shredder hammers 22*b* to impact the sugar cane against a hardened surface 24*b* to break the material apart. The shredded material may then be discharged onto the same conveyor for transportation to further processing. Alternatively, the material may be discharged onto a separate conveyor as disclosed in US Patent Application 2008/0277514.

Shredder hammers are routinely exposed to extremely harsh conditions of use, and typically are constructed from especially durable materials, such as hardened steel materials, such as low alloy steel or high manganese alloy content steel.

Each shredder hammer may weigh, for example, between 50 and 1200 lbs. During typical shredder operations these heavy hammers impact the material to be shredded at relatively high rates of speed. Even when employing hardened materials, the typical lifespan of a shredder hammer may, for example, only be a few days up to approximately 45 days. In particular, as the shredder hammer blade or impact area undergoes repeated collisions with the material to be processed, the material of the shredder hammer tends to wear away.

Once the hammers have been worn, the worn hammers must be replaced with new hammers. The hammers often cannot be replaced very easily. In some shredders, such as sugar cane shredders, the hammers are located within the shredding equipment such that they must be replaced by a human operating under limited conditions. Because of the weight of the hammers and the confined space in which the installer must be located to replace the hammers, it can be a difficult process and the installer is at risk of being injured while replacing the worn hammers.

In an attempt to minimize the weight to be handled by those working on shredders and ease the replacement of worn hammers, multiple two piece hammers have been used with varying degrees of success. For example, U.S. Pat. No. 2,397,776 (U.S. '776) discloses a two piece hammer with two shanks that are rotated into a replaceable tip. However, the two piece hammer in U.S. '776 requires the entire hammer to be disassembled in order to replace the tip. Needing to disassemble each hammer to replace the tips increases the downtime of the material reducing machine. U.S. Pat. No. 3,367,585 (U.S. '585) discloses another example of a two piece hammer. In U.S. '585 the replaceable tip is slid onto the shank and a pin passes through the tip and shank. Once the pin has been welded to the replaceable tip, the tip is maintained on the shank. Welding a pin onto the replaceable tip increases downtime of the equipment as the weld must be removed and a new weld put in place each time a tip is replaced. In addition it can increase the potential danger to the installer if the welding equipment needs to be used in confined spaces.

It should be appreciated that the greater throughput that the shredding equipment can process, the more efficiently and profitably the equipment can operate (i.e., minimal downtime for the shredding machine is desired). Accordingly, there is room in the art for improvements in the structure and construction of two piece shredder hammers and the machinery and systems utilizing such hammers.

Examples of shredder hammers and industrial shredding equipment are disclosed in U.S. Pat. Nos. RE14865, 1,281,829, 1,301,316, 2,331,597, 2,467,865, 3,025,067, 3,225,803, 4,049,202, 4,083,502, 4,310,125, 4,373,679, 6,102,312 and 7,325,761. The disclosures of these and all other publications referenced herein are incorporated by reference in their entirety for all purposes.

SUMMARY OF THE INVENTION

The present invention generally pertains to material reducing operations and to multi-piece hammers that can quickly and easily be replaced when worn.

In one aspect of the present invention, a multi piece hammer includes a base, a replaceable tip and a retainer. The replaceable tip has a cavity with a single rail or groove that corresponds to a single groove or rail on the base. Having a single rail or groove between the base and the replaceable tip enables the bearing faces to be maximized especially when used on a hammer that has a narrow constrained width.

In another aspect of the invention, a replaceable tip for a multi-piece hammer includes a cavity having a front end, an open rear end, an open top end, a bottom end, and a pair of opposing sidewalls, and a single rail is provided on one of the sidewalls.

In another aspect of the invention, the tip has a rail or groove on one of the sides of the tip that has a thickness or depth that is approximately between one fifth and one half of the overall width of the cavity. In one preferred construction, the thickness or depth of the rail or groove is between one forth and two fifths the overall width of the cavity. In another preferred construction the rail or the groove is approximately one third the overall width of the cavity. Having a rail or groove that is relatively thick allows for the bearing surfaces between the base and tip to be maximized.

In another aspect of the invention, the tip has a rail(s) or groove(s) that is angled from the top end to the bottom end and from the front end to the rear end so that the replaceable tip will be held to the base of the hammer by centrifugal force when the hammer spins. The angle of the rail or groove is preferably between 35 and 65 degrees relative to the centrifugal force of the hammer spinning around the drum. In one preferred construction, the angle of the rail or groove is between 45 and 55 degrees relative to the centrifugal force. In another preferred construction the rail or groove is 50 degrees relative to the centrifugal force.

In another aspect of the invention, the tip has a transition surface within the cavity of the tip that is rounded. In one preferred construction, the rounded transition surface curves from the front end toward the bottom end. The curved surface of the replaceable tip generally matches the exterior wear profile of the tip once worn. Having an interior transition surface that matches the exterior wear profile of the worn tip allows the tip to be worn a significant amount without the base being worn.

In another aspect of the invention, the tip has a cavity with a bottom bearing surface in the bottom end of the tip that is generally parallel to the centrifugal force of the hammer spinning around the drum. The bottom bearing surface is transversely offset from a front bearing surface in the front end of the cavity of the tip. Preferably the front bearing surface and the bottom surface are connected to each other by a generally smooth transition surface and the bottom bearing surface directly opposes a front strike face of the tip.

In another aspect of the invention, the tip is secured to the base by a retainer that extends only into one side of the tip. In one preferred construction, the tip is free of an opening that extends from the cavity to the exterior surface of the tip and the tip is provided with a retainer that does not extend completely through any part of the tip and does not protrude through the exterior surface of the tip.

In another aspect of the invention, the retainer extends through the base and into a rail within the cavity of the tip. Having a retainer that extends into the rail within the cavity allows the retainer to secure the tip in the region where the tip is the thickest.

In another aspect of the invention, the hammer is provided with an integral retainer. The retainer can be adjusted between two positions with respect to the base: a first position where the tip can be installed or removed from the base, and a second position where the tip is secured to the base by the retainer. The retainer is preferably securable to the base or tip by mechanical means at the time of manufacture so that it can be shipped, stored and installed as an integral unit with the base or tip, i.e., preferably with the retainer in a “ready to install” position. Once the tip is placed onto the base, the retainer is moved to a second position to retain the tip in place for use in a material reducing machine. The retainer can continually be maintained in the base or tip throughout the life of the base or tip and does not need to be completely removed each time a tip is replaced. In the alternative of having the retainer integrally connected to the tip, a new retainer is provided with each new tip.

Other aspects, advantages, and features of the invention will be described in more detail below and will be recognizable from the following detailed description of example structures in accordance with this disclosure.

DETAILED DESCRIPTION OF THE PREFERRED EMBODIMENTS

The present invention relates to material reducing machines. More particularly, this invention relates to material reducing machines that include hammers. The material reducing machine is preferably provided with multiple hammers with multiple pieces comprising a shank or base and a replaceable tip. The multi piece hammers are well suited for use in sugar cane shredders but other uses are possible.

Relative terms such as front, rear, top, bottom and the like are used for convenience of discussion, and are generally used to indicate the orientation of the shredder hammer while the hammer is at rest (i.e., while the drive shaft of the material reducing equipment is at rest). The front end is generally used to indicate the end that initially impacts the material to be reduced, the rear end is generally used to indicate the end opposite the front end, the top end is generally used to indicate the end closest to the drive shaft, and the bottom end is generally used to indicate the end opposite the top end. Nevertheless, it is recognized that when operating the shredding system the hammers attached to the drum may be oriented in various ways as the drum rotates. Additionally, as the hammers impact material they may move back and forth on the pin during use.

Figure 1:
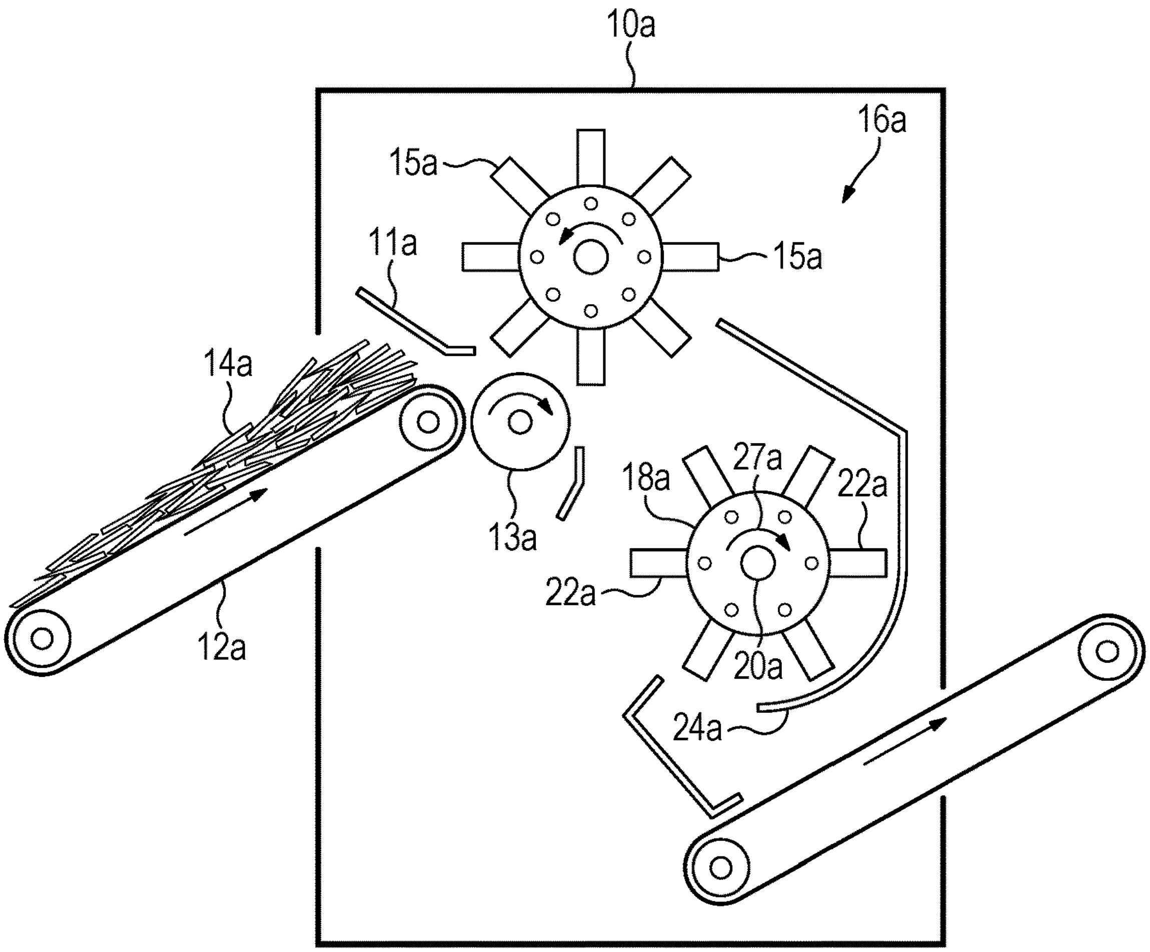
FIG. 1 (Prior Art)
FIG. 1 is a schematic depiction of a prior art vertical shredding system.
Figure 2:
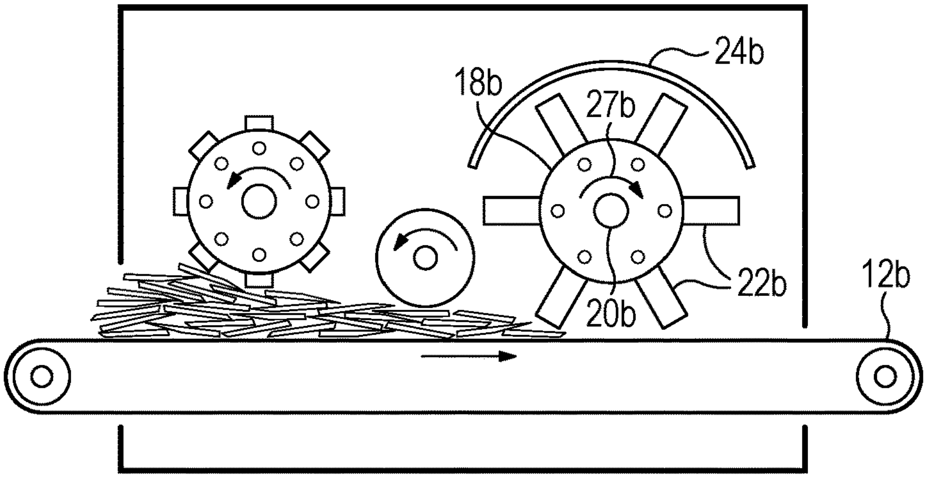
FIG. 2 (Prior Art)
FIG. 2 is a schematic depiction of a prior art horizontal shredding system.
Figure 3:
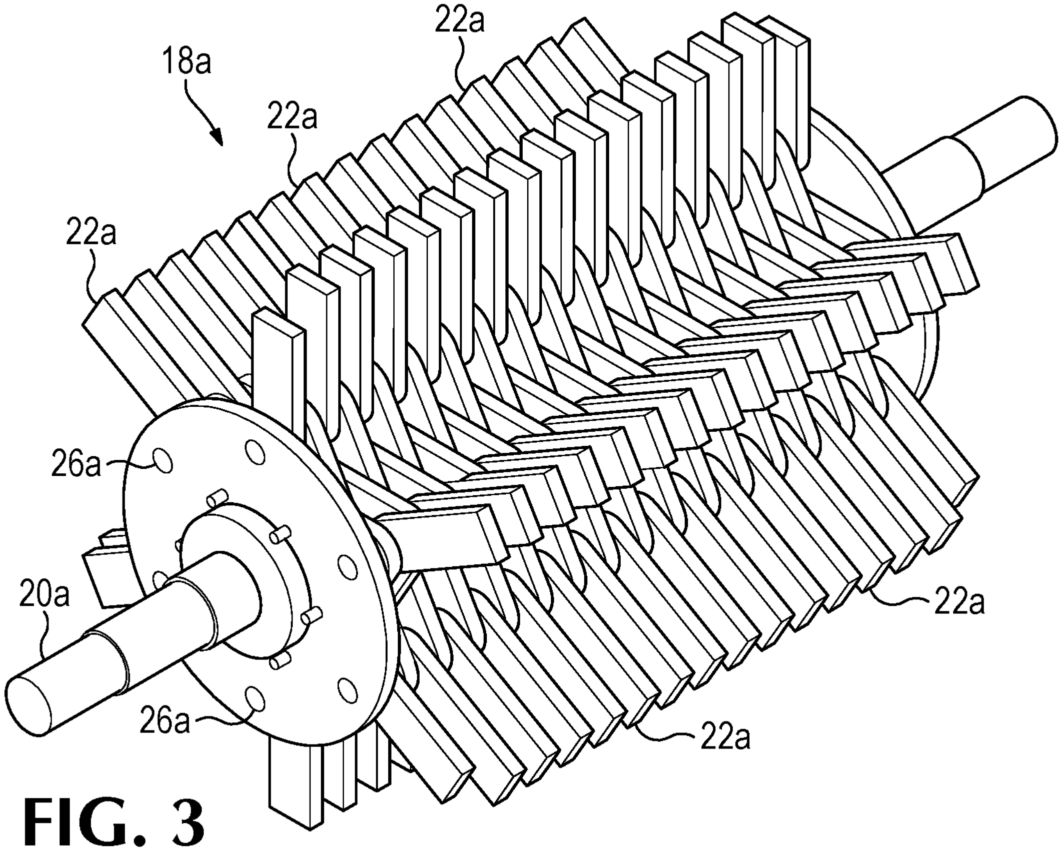
FIG. 3 (Prior Art)
FIGS. 3 and 4 are perspective views of the rotating head of FIG. 1.
Figure 4:
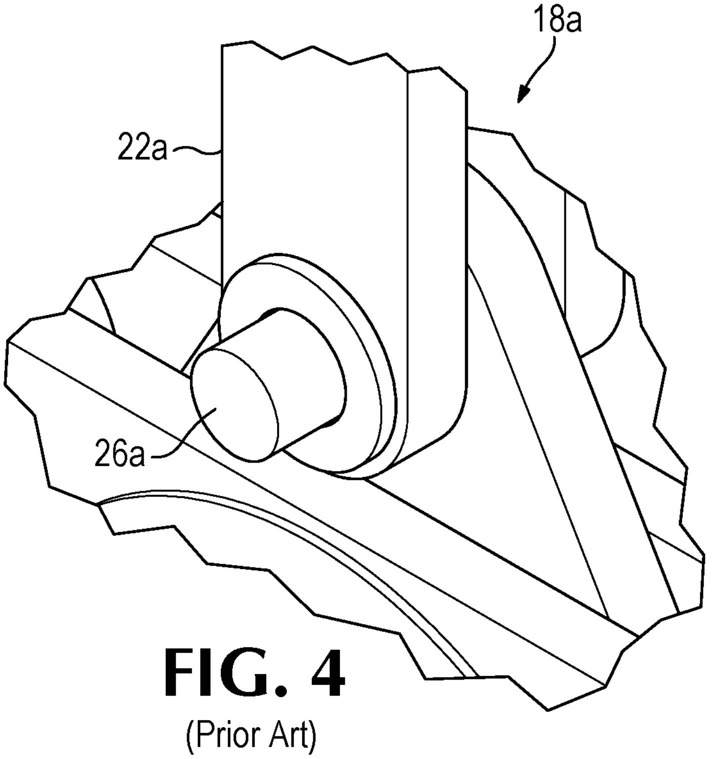
FIG. 4 (Prior Art)
Figure 5:
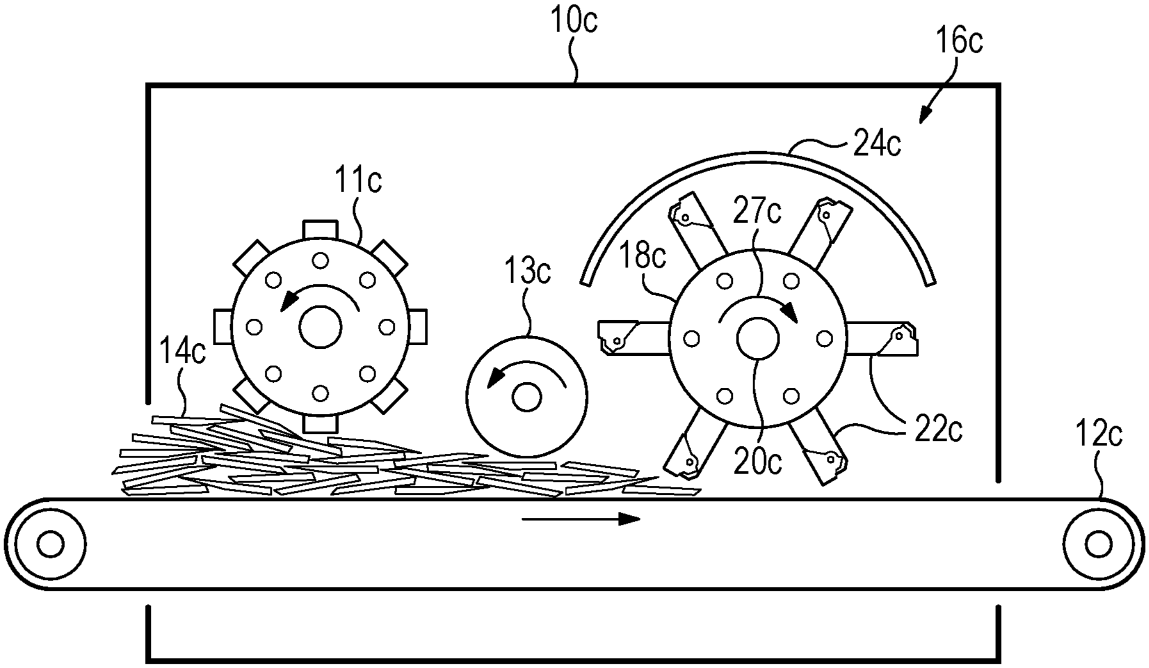
FIG. 5 is a schematic depiction of a horizontal shredding system equipped with one embodiment of hammers in accordance with the present invention.
Figure 6:
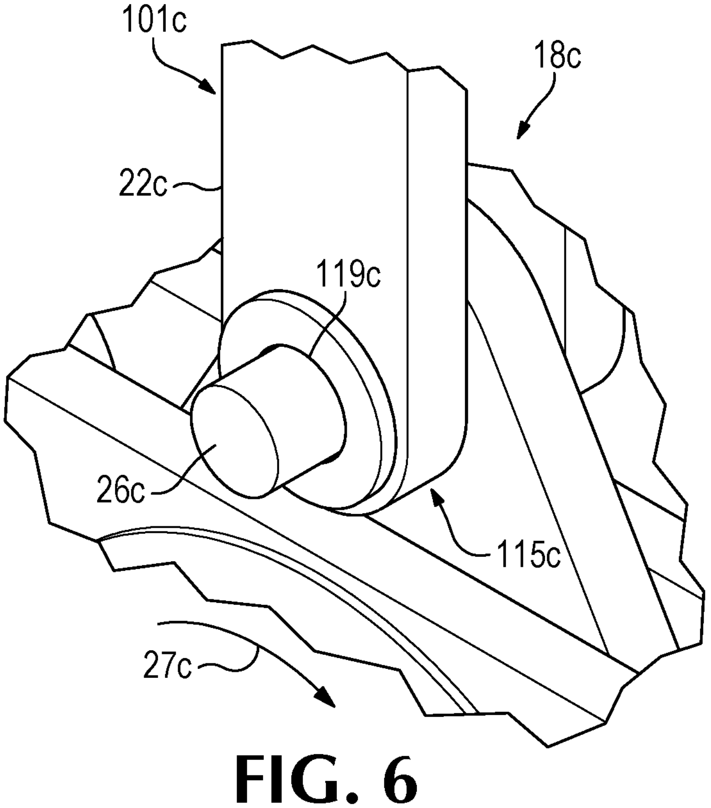
FIG. 6 is a partial perspective view of the rotating head of FIG. 5.

FIGS. 5 and 6 show an example of a horizontal shredder 10*c* equipped with hammers 22*c* of the present invention. It should be understood that aspects of the hammers of the present invention may be used with hammers for vertical shredders or other reducing machines for processing rocks, clay, rubber (e.g., car tires), wood, paper, scrap metal, automobiles, automobile body parts, and the like.

A material intake 12*c* (such as a conveyor) introduces material 14*c* to be shredded into a shredding chamber 16*c*. The material 14*c* to be shredded may be of any desired size or shape. The material intake 12*c* may optionally include levelers 11*c*, feed rollers 13*c*, or other machinery to facilitate feeding material 14*c* into chamber 16*c*, and/or to control the rate at which material 14*c* enters chamber 16*c*, and/or to prevent the material 14*c* from moving backward on the conveyor 12*c*.

A plurality of hammers 22*c* attached to the head 18*c* spin at very high speeds about a shaft or axis 20*c* in a direction of rotation indicated by arrow 27*c* to impact and separate material into smaller portions allowing the reduced material to be further processed in downstream operations. The rotary head 18*c* may have, for example, 50 to 200 hammers to break up the material. Each hammer 22*c* is independently pivotally mounted to the rotary head. In response to centrifugal forces as head 18*c* rotates, each hammer extends outward, tending toward a position where the center of gravity of each hammer is spaced outward as far as possible from rotation axis 20*c* when no material is in the chamber. The target material is initially impacted by a leading impact face of the hammer passing a hardened surface 24*c* near the material inlet. This hardened surface may be, for example, the feed roller, an anvil, chamber walls, or adjacent hammers; in this example, it is an anvil. In response to material in the system contacting the hammer leading face, the hammers, in some cases, deflect and rotate backwards on the mounting pins 26*c* as the hammers impact the material and crush it against the hardened surfaces 24*c* in the reducing chamber. Contact of the hammers 22*c* with the material 14*c* fed into the shredding machine fractures, compresses and shears the material into smaller pieces. The target material is reduced in size as the materials are compressed and shredded between the outer surface (i.e., the wear edge) of the hammer and the hardened surfaces in the reducing chamber. The shredded material may then be discharged onto a conveyor for transportation to further processing.

In one preferred embodiment of the invention (FIGS. 5 to 20), hammers 22*c* are made of a shank or base 101*c* and a replaceable tip 201*c*. The replaceable tip 201*c* is secured to the base 101*c* with a retainer 301*c*. Base 101*c* is shown as having a generally rectangular shape with a top surface 103*c* generally concentric to the mounting pin 26*c* on head 18*c*, a bottom surface 105*c* opposite the top surface 103*c*, a rear surface 107*c* facing away from the leading face of the hammer, and a front surface 109*c* facing the same direction as the leading face of the hammer, and two side surfaces 111*c* and 113*c* between the front and rear surfaces 107*c* and 109*c*. The general shape of the base is not intended to be limiting as the shape of the base will vary depending on the material to be reduced or processed and the type of reducing machine the hammer is to be used in. For example, in alternative embodiments the base may generally have a tear drop shape, an elliptical shape, or a cylindrical shape. In addition the base may have one or more recesses extending into either side surface to balance the hammer and obtain an optimal center of gravity for the hammer.

Base 101*c* has a top mounting end 115*c* for mounting the hammer onto the head 18*c* and a bottom mounting end 117*c* for mounting the replaceable tip 201*c* on the base 101*c*. The top mounting end has a through hole 119*c* for mounting the hammer on the mounting pin 26*c* of the head 18*c*. Thickened portions 121*c* may be provided on the sidewalls 111*c* and 113*c* adjacent through hole 119*c* to reinforce the hole.

Top surface 103*c* is shown as being rounded and generally concentric to through hole 119*c*, but other arrangements are possible. In addition, the thickness between the through hole 119*c* and the top surface 103*c* is preferably relatively thin so that most of the mass of the base 101*c* is below the through hole. Having a majority of the mass below the through hole 119*c* maximizes the force the hammer 22*c* will have when the leading face impacts the material 14*c* to be shredded or reduced. The top surface 103*c*, however, may have a variety of shapes and the thickness between the through hole 119*c* and the top surface 103*c* may have a variety of thicknesses as long as sufficient clearance is provided for the hammers to have the freedom of movement desired for the machine in which it is mounted. The hammers 22*c* may rotate on the mounting pins 26*c* without interference with other hammers 22*c*, pins, or the head 18*c*.

Figure 11:
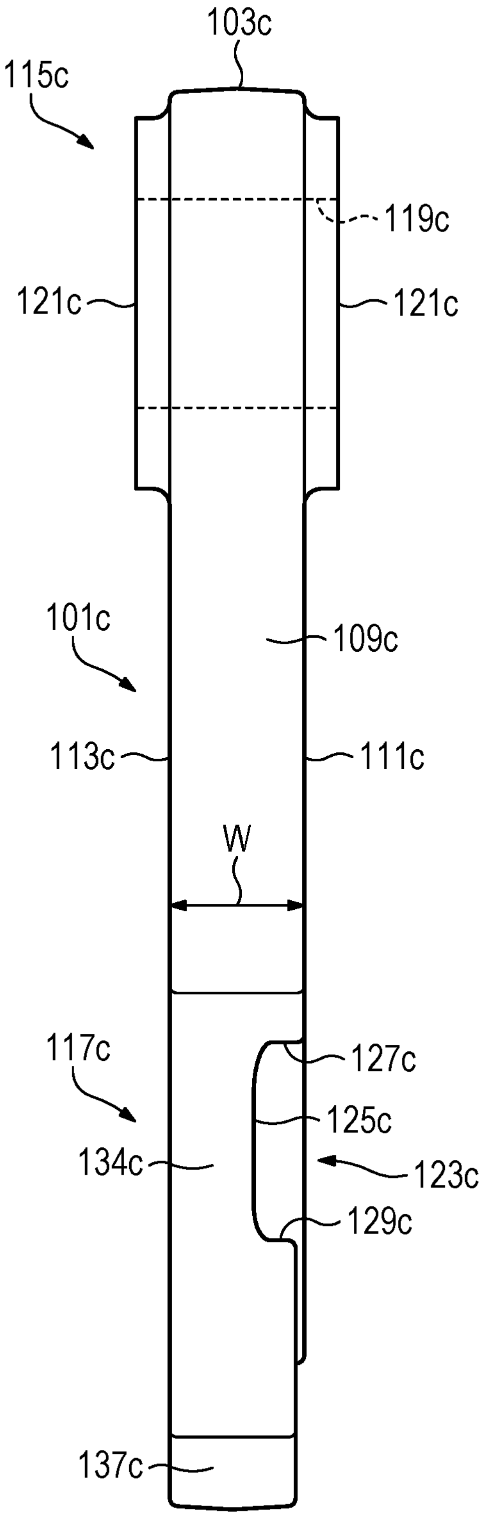
FIGS. 11 and 12 are front and rear views of the base of the hammer shown in FIG. 5.
Figure 12:
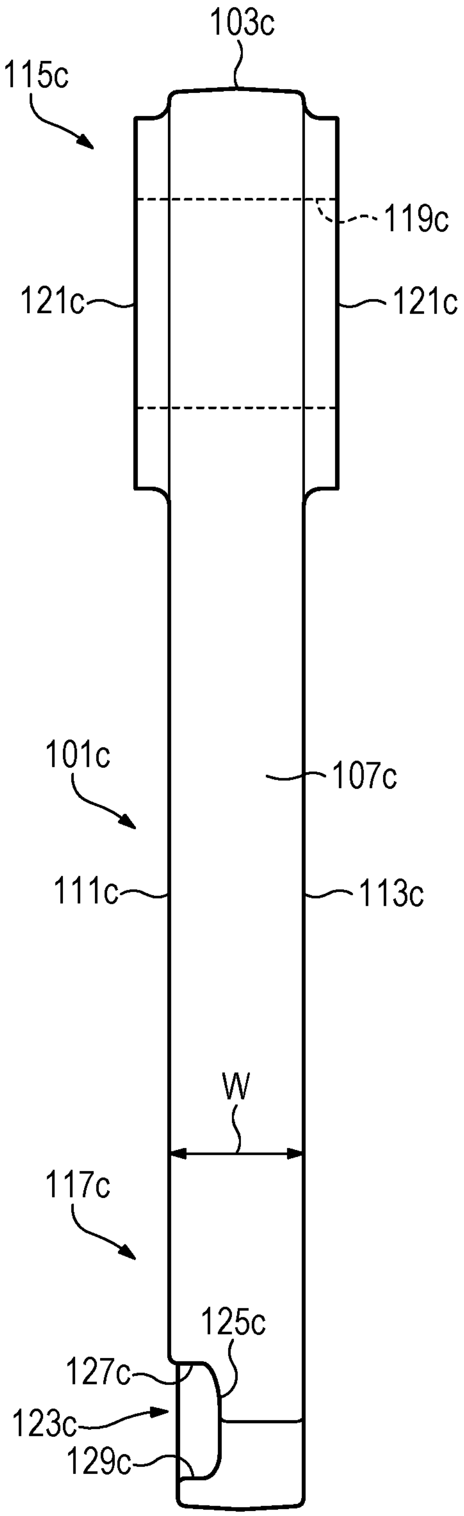
Figure 13:
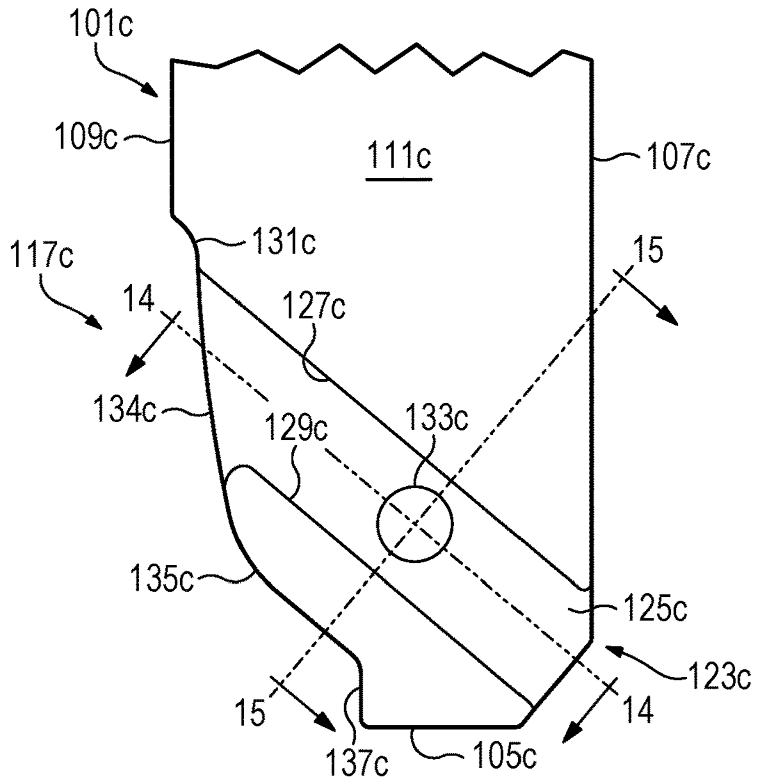
FIG. 13 is a partial side view of the base of the hammer shown in FIG. 5.
Figure 14:
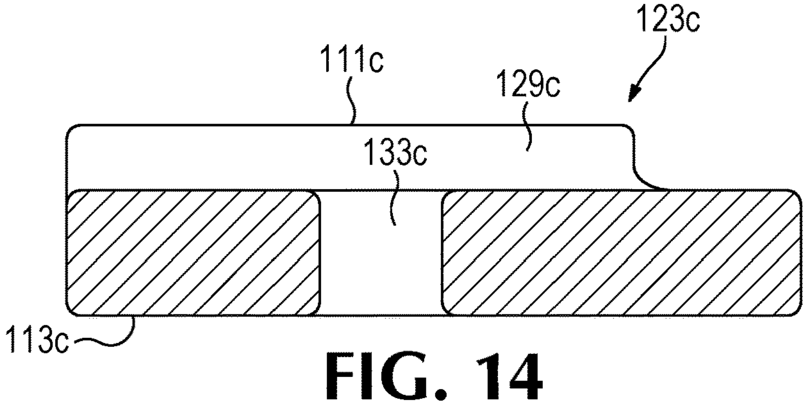
FIG. 14 is a cross sectional view of the base of the hammer shown in FIG. 5 taken along lines 14-14 in FIG. 13.
Figure 15:
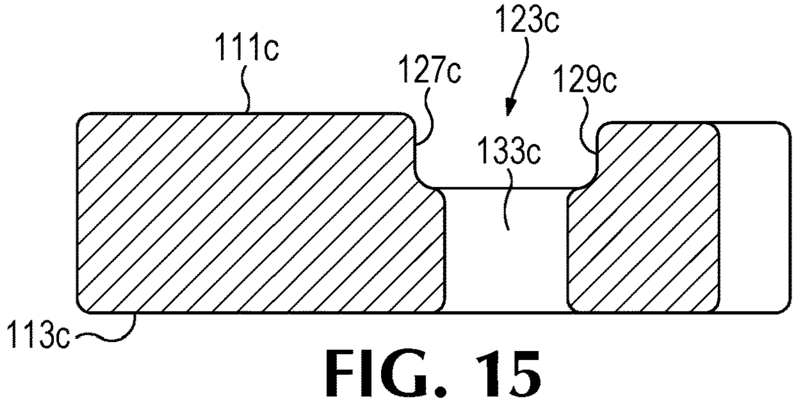
FIG. 15 is a cross sectional view of the base of the hammer shown in FIG. 5 taken along lines 15-15 in FIG. 13.
Figure 16:
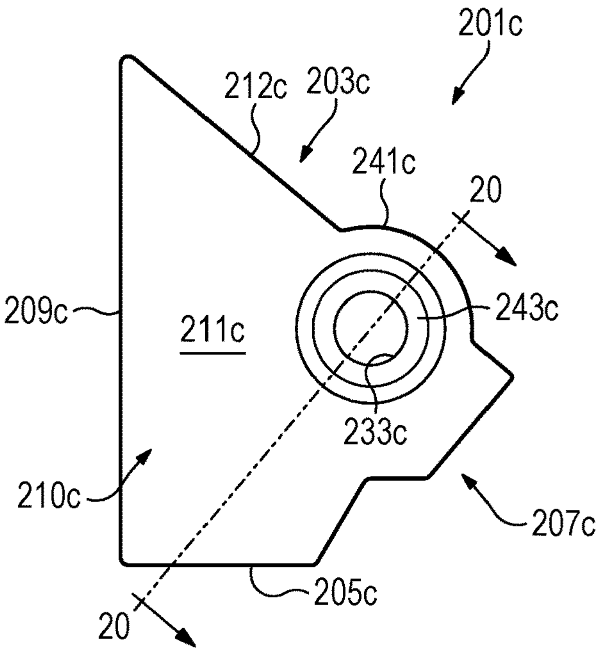
FIG. 16 is a side view of the tip of the hammer shown in FIG. 5.
Figure 17:
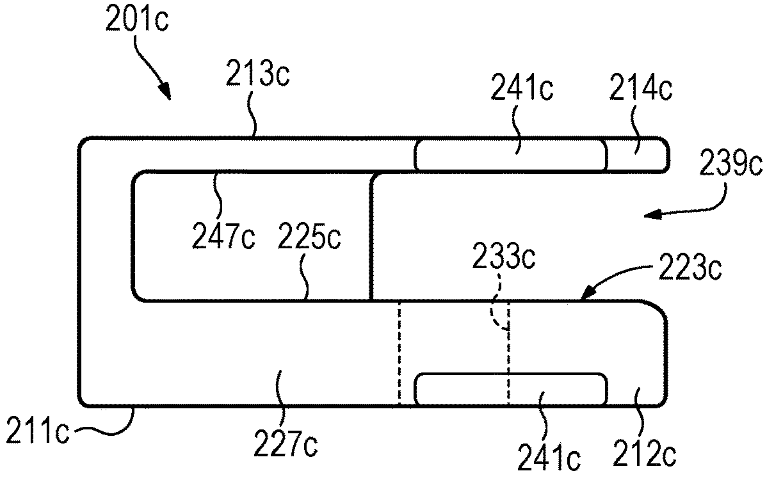
FIG. 17 is a top view of the tip of the hammer shown in FIG. 5.
Figure 18:
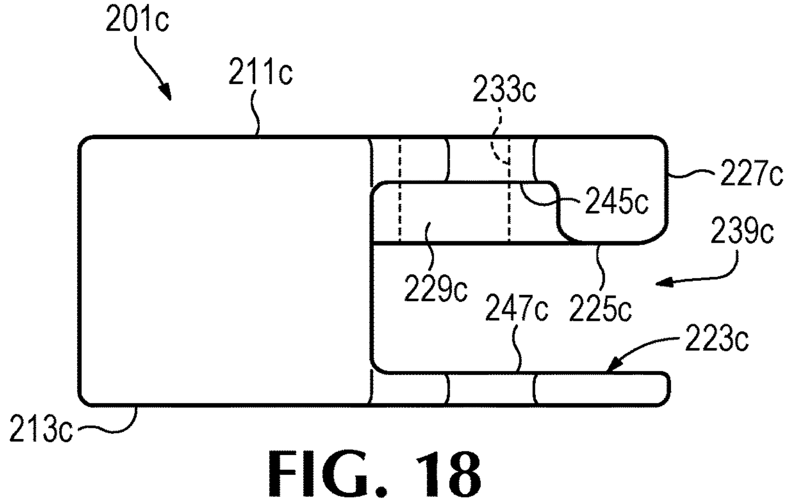
FIG. 18 is a bottom view of the tip of the hammer shown in FIG. 5.

The bottom mounting end 117*c* of base 101*c* is provided with a groove 123*c* that corresponds to a rail 223*c* on the tip 201*c*. Groove 123*c* preferably extends into the side surface 111*c* to a depth between one fifth and one half of the overall width W of the base 101*c*, where the width W is distance between the sidewalls 111*c* and 113*c* when measured in the bottom mounting end 117*c* of base 101*c* as shown in FIGS. 11 and 12. In one preferred embodiment, the depth of the groove 123*c* extends into the side surface 111*c* to a depth between one fourth and two fifths of the overall width W of the base 101*c*. In another preferred embodiment, the depth of the groove 123*c* extends into the side surface 111*c* to a depth of approximately one third the overall width W of the base 101*c*. A groove that extends relatively deep into the width of the base 101*c* allows more surface area between the base 101*c* and the tip 201*c* to better withstand and resist the applied loads during use. Base 101*c* and tip 201*c* are shown as only having one groove on one of the sides 111*c*. Having a rail and groove on only one side allows the surface area to be maximized when the width of the base is constrained to be relatively narrow. However in some embodiments a groove and rail may be located on each side of the base 101*c* and tip 201*c*. Additionally, the rail or rails could be provided on the base and the groove or grooves could be provided on the tip, and the depth of the rails and grooves could be more than half the width of the base or less than one fifth the width of the base.

Figure 10:
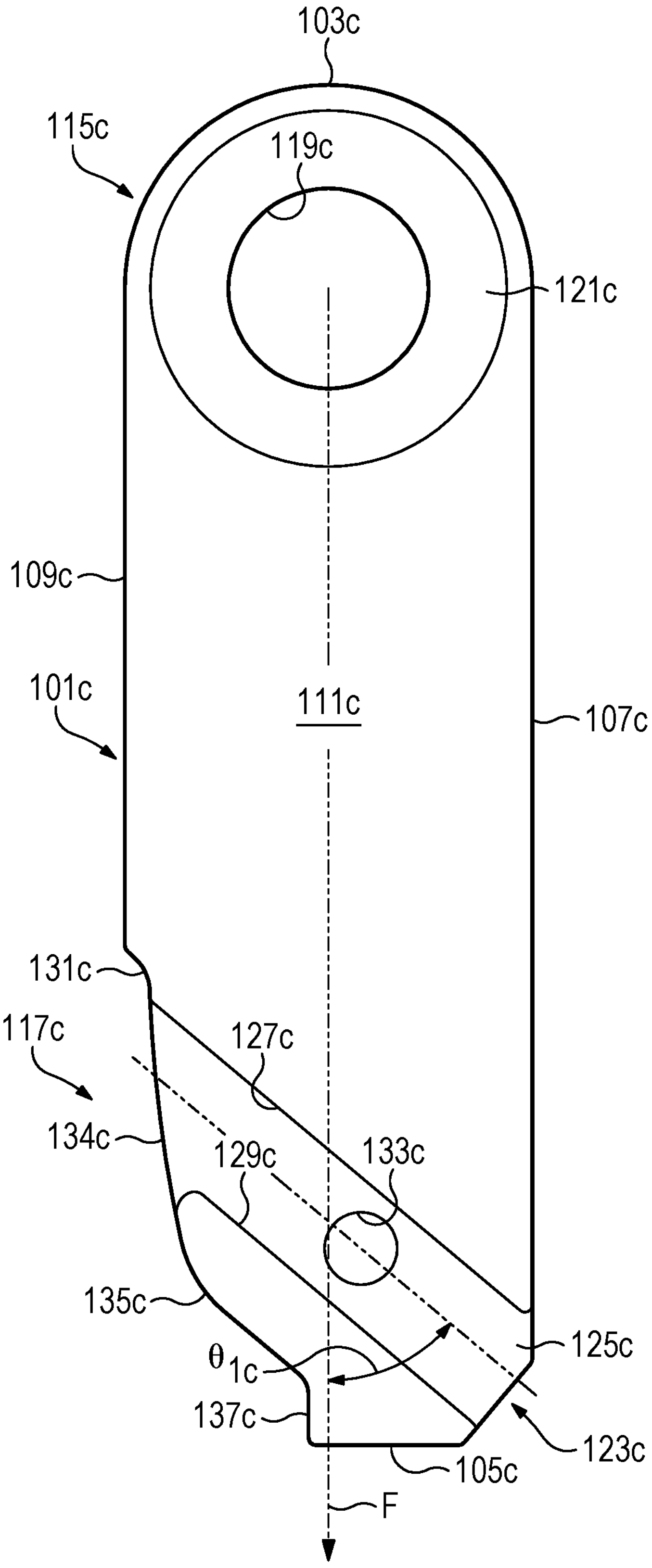
FIG. 10 is a side view of the base of the hammer shown in FIG. 5.

Groove 123*c* preferably extends all the way across the base 101*c* from the front surface 109*c* to the rear surface 107*c*. In alternative embodiments not shown, the groove may not extend completely across the rear end 107*c*. Groove 123*c* is preferably angled downward from the front surface 109*c* to the rear surface 107*c* so that the end of the groove closest to front surface 109*c* is generally closer to upper end 103*c* of base 101*c* and with the end of groove 123*c* closest rear end 107*c* is generally farther away from the upper end 103*c*. Thus, when the rail 223*c* of tip 201*c* is secured in groove 123*c* the centrifugal force F of the hammer 22*c* spinning around the head 18*c* tends to urge the tip 201 farther downward and into the groove 123*c*. The base 101*c* has a bottom bearing surface 137*c* that engages a bottom bearing surface 237*c* on the tip 201*c* to act as a stop to prevent the rail 223*c* on tip 201*c* from being urged out the bottom end of groove 123*c*. The groove 123*c* has a downward angle $\Theta_{1c}$ relative to the centrifugal force F between 35 and 65 degrees (FIG. 10). In the illustrated example, the centrifugal force is along the longitudinal axis of the base, i.e., radially vertical from through hole 119*c*. In one preferred embodiment, the angle $\Theta_{1c}$ of the groove 123*c* is between 45 and 55 degrees relative to the centrifugal force F. In another preferred embodiment, the angle $\Theta_{1c}$ of the groove 123*c* is 50 degrees relative to the centrifugal force F. Alternatively, the groove 123*c* may have an angle $\Theta_{1c}$ less than 35 degrees, greater than 65 degrees up to and including about 90 degrees (i.e., generally perpendicular to the centrifugal force F).

Groove 123*c* is shown as being generally U-shaped with an inner surface 125*c* and an upper and lower surface 127*c* and 129*c*. Inner surface 125*c* is generally perpendicular to upper and lower surfaces 127*c* and 129*c* and upper and lower surfaces 127*c* and 129*c* are generally parallel to each other (e.g., a small draft between 1 and 6 degrees may be provided for upper and lower surfaces 127*c* and 129*c* for manufacturing purposes so that the surfaces are not exactly parallel to each other). The shape of the groove 123*c* is not intended to be limiting as alternative shapes are possible. For example, the groove may be generally triangular, dovetail, or concave, and the upper and lower surfaces may converge toward each other as they extend toward the rear end 107*c*.

A recess 131*c* is preferably provided on the front surface 109*c* and above the upper surface 127*c* of the groove 123*c*. Recess 131*c* provides clearance to receive tip 201*c* so that tip 201*c* will have minimal wear on front surface 109*c* as the tip impacts the material to be shredded. Recess 131*c* also allows a tool to be inserted to pry the tip 201*c* out of the groove 123*c* and off of the base 101*c*.

An opening 133*c* extends into or through base 101*c* for receipt of a retainer 301*c*. Opening 133*c* preferably extends through inner surface 125*c* of groove 123*c*. Opening 133*c* is preferably located generally in the center of the primary and reactionary forces between the base 101*c* and the tip 201*c* as the hammer 101*c* engages the material to be reduced. Having the retainer 301*c* generally in the center of the primary and reactionary forces reduces the loading on the retainer 301*c*. Alternatively, opening 133*c* may extend into or through the upper or lower surfaces 127*c* and 129*c* of groove 123*c* or the opening 133*c* could be above or below groove 123*c* depending on the shape of the tip 201*c*. In alternative embodiments, the opening 133*c* may not extend completely through base 101*c* and may not be generally located in the center of the primary and reactionary forces.

A front surface 134*c* is provided adjacent the front surface 109*c* and adjacent the inlet of groove 123*c*. Front surface 134*c* is preferably spaced rearward from front surface 109*c* and has a slight rearward taper. With this arrangement, the tip is fit with the base so that tip 201*c* has a tendency to first bear against the upper surface 127*c* of groove 123*c* and then against front bearing surface 134*c* when impacting the material to be shredded. Front surface 134*c* is primarily provided as a secondary bearing surface for bearing against the tip 201*c* under rebound conditions.

Below groove 123*c* in the mounting section 117*c* of base 101*c* is a transition surface 135*c*. Transition surface 135*c* generally matches a transition surface 235*c* on tip 201*c* as it extends from front surface 134*c*. Transition surface 135*c* forms a curved surface from the front surface 134*c* towards the bottom surface 105*c*. The lower part of transition surface 135*c* may be generally parallel to groove 125*c* and the upper part may generally match an outer wear profile of tip 201*c*. Transition surface 135*c* and front surface 134*c* are preferably recessed from front surface 109*c* to allow tip 201*c* to have more material for wearing. At the bottom of transition surface 135*c* a bottom bearing surface 137*c* is provided. Bottom bearing surface 137*c* is generally parallel to the centrifugal force F to better resist the impact loads but other orientations are possible.

The replaceable tip 201*c* has an open top 203*c* and open rear end 207*c* for receipt of base 101*c*. Replaceable tip 201*c* has a front surface 209*c* facing the direction of the rotation of the hammer 22*c* and a bottom surface 205*c* generally facing perpendicular to the centrifugal force F of the hammer 22*c* spinning around the drum 18*c*. Two side surfaces 211*c* and 213*c* are provided between the front surface 209*c* and rear end 207*c*. Together side surfaces 211*c* and 213*c*, front surface 209*c* and bottom surface 205*c* make up the exterior surface 210*c* of the replaceable tip 201*c*.

Figure 21:
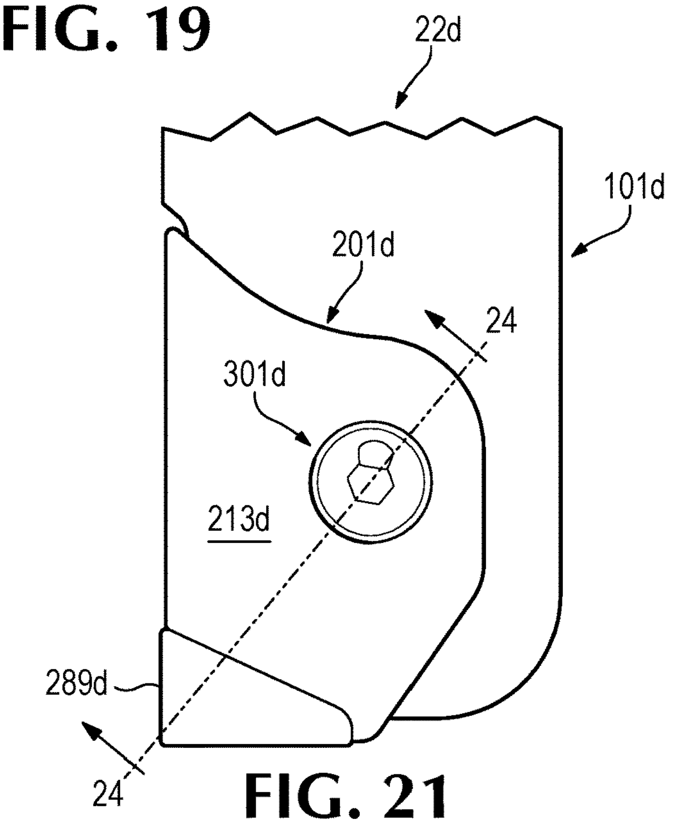
FIG. 21 is a side view of an alternative multi piece hammer in accordance with the present invention.
Figure 22:
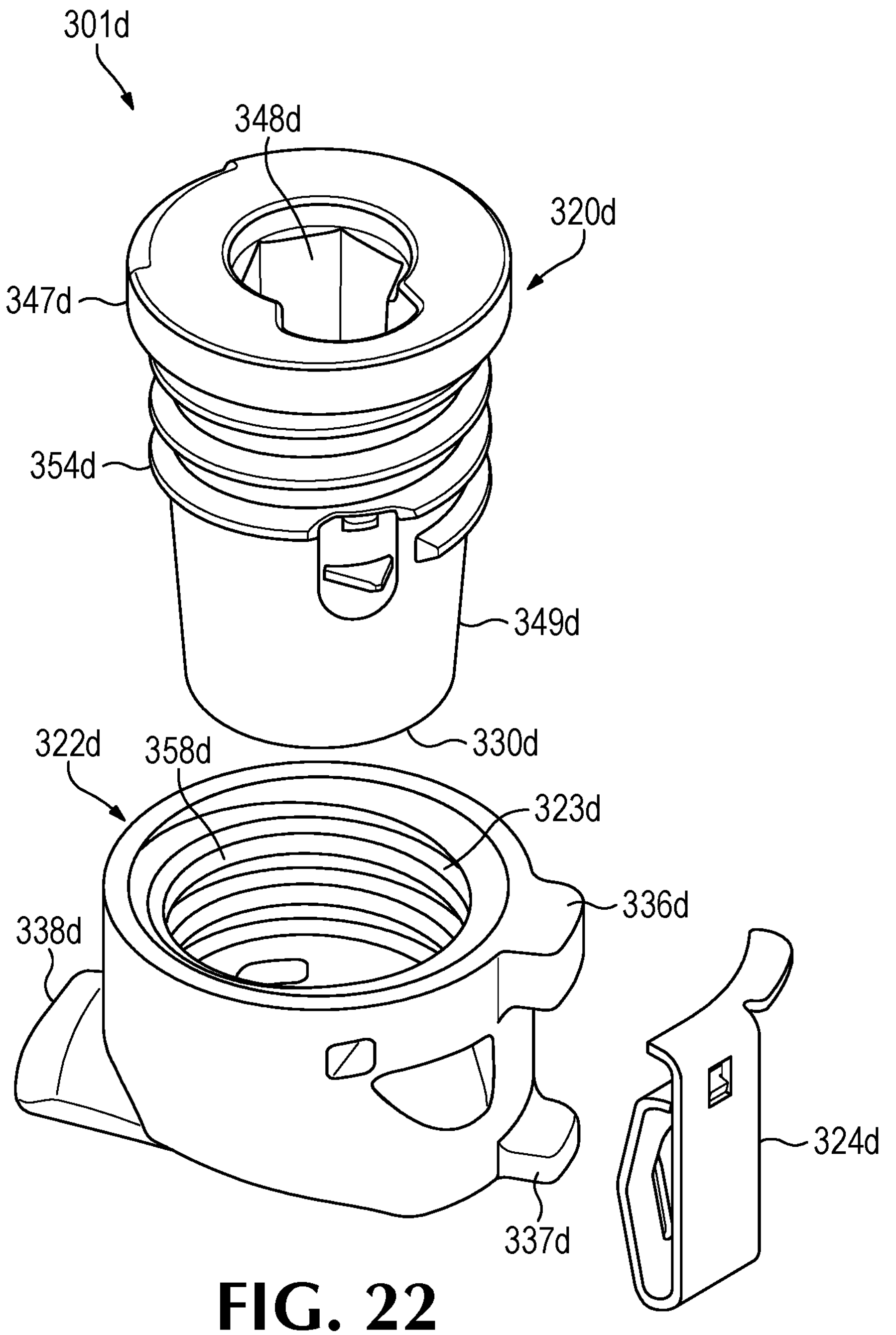
FIG. 22 is a perspective view of the retainer shown in FIG. 21.
Figure 23:
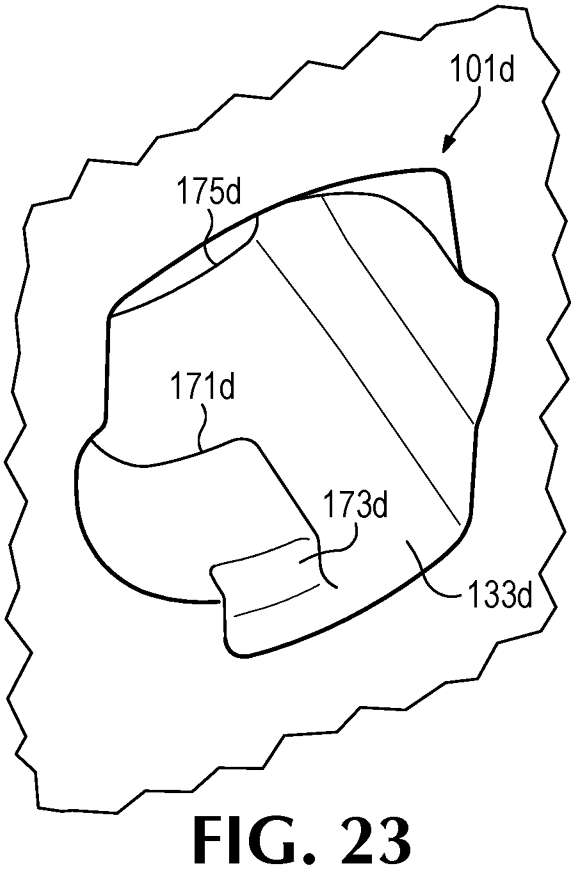
FIG. 23 is a partial view of the base shown in FIG. 21 showing a hole for receiving a retainer.

Generally, front surface 209*c* initially impacts the material 14*c* to be shredded. Front surface 209*c* and bottom surface 205*c* could have a variety of shapes and orientations. For example, front face 209*c* may be generally parallel to the centrifugal force as shown or at an angle to the direction of the centrifugal force. The front face may also have a convex, concave, or irregular configuration. Similarly bottom surface 205*c* may have a variety of shapes, for example, the bottom surface may be generally perpendicular to the front surface 209*c* as shown, or may have a convex or concave curve, and may be provided with recesses or grooves. It should be appreciated that other shapes of the exterior surface 210*c* are possible. For example, the exterior surface of the tip may have an exterior surface with recesses and notches and front and bottom surfaces that are orientated similar to hammers and crushing tips disclosed in WO 2014/205123, WO 2014/153361 or US Patent Publications 2014-0151475, 2013-0233955, or 2009-0174252 each of which is incorporated herein by reference. Additionally the exterior surface may be provided with one or more wear indicators so that the operator can quickly tell if the replaceable tip needs to be replaced. The wear indicators may be placed anywhere along the wear profile of the tip and may, for example, be a notch located at the rear end of the tip. In addition the front surface and sides of the tip may be covered with hard facing 289*d* as shown in FIG. 21 or provided with inserts of a different material than the body of the tip as disclosed in US Patent Publication 2013-0233955 which is incorporated herein by reference (not shown). The inserts may comprise a hardened material such as diamond, tungsten carbide or carbon nitride. The inserts may be held in cast or drilled holes in the tip, may be cast in place when the hammer is manufactured or attached in other ways.

Figure 20:
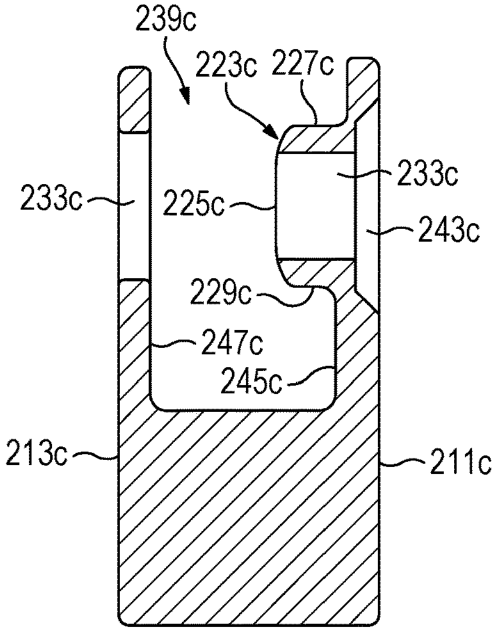
FIG. 20 is a cross sectional view of the tip of the hammer shown in FIG. 5 taken along lines 20-20 in FIG. 16.

Although numerous shapes are possible, the top edge 212*c* and 214*c* of sidewalls 211*c* and 213*c* are shown as generally aligned and parallel with a rail 223*c* in a socket 239*c* of tip 201*c*. An opening 233*c* extends completely through the sidewalls 211*c* and 213*c* as shown in FIG. 20. Preferably opening 233*c* also extends through the rail 223*c*. A protrusion 241*c* may be provided along one or both of top edges 212*c* and 214*c* to provide additional support to opening 233*c*. Depending on the size of the retainer, the protrusion may extend into the rear end 207*c* (i.e., in general, the larger the retainer, the larger the protrusion will ordinarily be). A recess or countersink 243*c* may be provided on one or both side surfaces 211*c* and 213*c* adjacent opening 233*c* in order to minimize the wear that retainer 301*c* will experience and maintain retainer 301*c* in a shadow of the front leading surface 209*c*. In other embodiments, opening 233*c* may extend only through a portion of the tip and is largely dependent on the type of retainer to be used to hold the tip 201*c* onto the base 101*c*. Additionally the opening and retainer may be located in surfaces other than the sidewalls 211*c* and 213*c* and may, for example, be in the front surface 209*c* or the bottom surface 205*c*.

Figure 19:
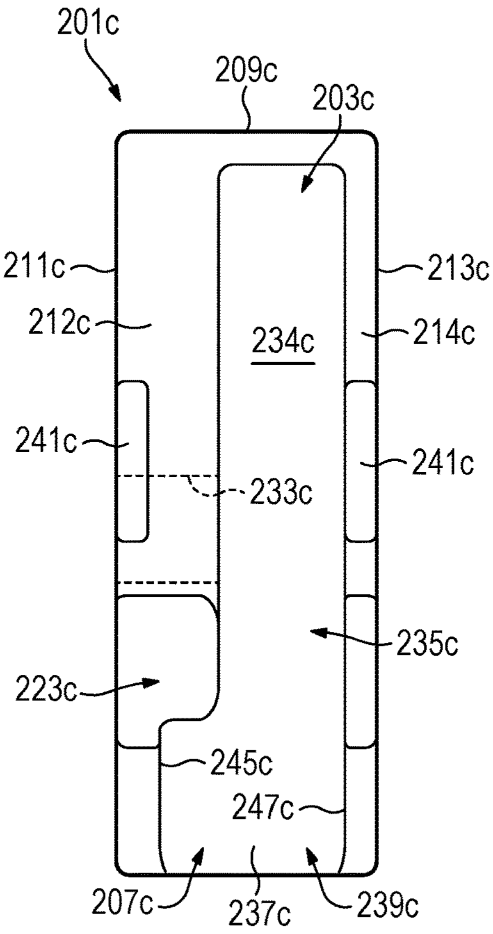
FIG. 19 is a rear view of the tip of the hammer shown in FIG. 5.

As shown in FIG. 19, cavity 239*c* extends into the top end 203*c* and rear end 207*c* so that the cavity 239*c* is provided with two sidewalls 245*c* and 247*c* that generally correspond to sidewalls 111*c* and 113*c* of base 101*c*. The front end of cavity 239*c* closest to front surface 209*c* has a front surface 234*c* to correspond to and bear against front surface 134*c* of base 101*c*. Front surface 234*c* preferably has a slight angle relative to the centrifugal force F so that tip 201*c* has a tendency to first bear against the upper surface 227*c* of rail 223*c* and then against front surface 234*c* when impacting the material to be shredded. Front surface 234*c* transitions into a transition surface 235*c* that corresponds to transition surface 135*c* on base 101*c*. Transition surface 235*c* generally curves from the front surface 234*c* towards a bottom bearing surface 237*c*. Parts of transition surface 235*c* may be generally parallel to rail 225*c* and parts may generally match an outer wear profile of tip 201*c*. At the bottom of transition surface 235*c*, a bottom bearing surface 237*c* is provided. Bottom bearing surface 237*c* is generally parallel to the centrifugal force F and bears against bottom bearing surface 137*c* of base 101*c* but other orientations are possible.

Sidewall 245*c* is provided with a rail 223*c* that corresponds to a groove 123*c* on the base 101*c*. Rail 223*c* preferably extends into the cavity 239*c* towards sidewall 247*c* to a depth between one fifth and one half of the overall width of the cavity 239*c*. A rail that extends relatively deep into the width of the cavity 239*c* allows more surface area between the base 101*c* and the tip 201*c*. In one preferred embodiment, the depth of the rail 223*c* extending into the cavity 239*c* is between one fourth and two fifths of the overall width of the cavity 239*c*. In another preferred embodiment, the depth of the rail 223*c* extending into the cavity 239*c* is approximately one third the overall width of the cavity. Additionally, the depth of the rails could be more than half the width of the cavity or less than one fifth the width of the cavity. Rail 223*c* and groove 123*c* have a width W large enough to support retainer 301*c*.

Figure 7:
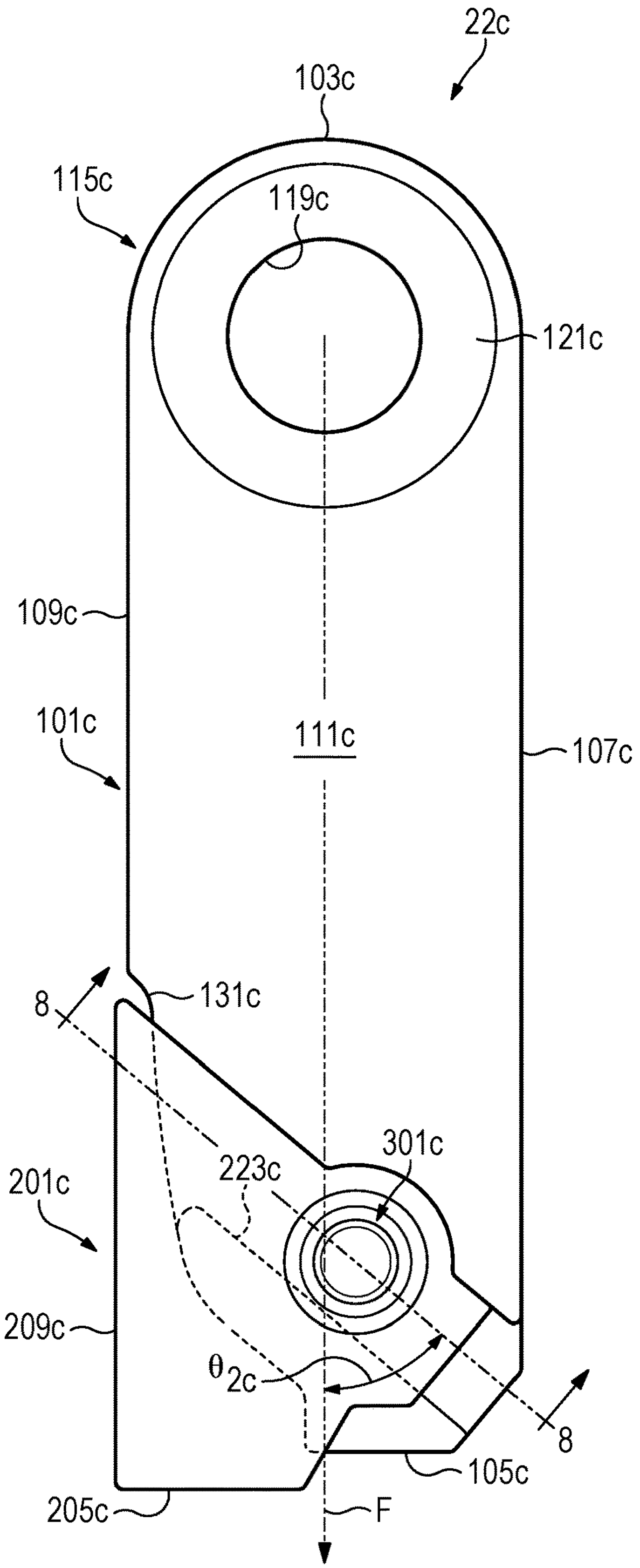
FIG. 7 is a side view of the multi piece hammer shown in FIG. 5.

Rail 223*c* preferably extends from the front end of the cavity 239*c* all the way to the rear end 207*c* of tip 201*c*. Alternatively, the rail may not extend completely to the rear end 207*c*. Rail 223 corresponds to groove 123*c* and is angled downward from the front end of the cavity to the rear end 207*c*. As with the groove 123*c*, the rail 223*c* has a downward angle $\Theta_{2c}$ relative to the centrifugal force F of the tip 201 swinging with the hammer 22*c* around the drum 18*c* (FIG. 7 shows the rail 223 with phantom lines). $\Theta_{2c}$ is preferably between 35 and 65 degrees. In one preferred embodiment, the angle $\Theta_{2c}$ of the rail 223 is between 45 and 55 degrees relative to the centrifugal force F. In another preferred embodiment, the angle $\Theta_{2c}$ of the rail 223*c* is 50 degrees relative to the centrifugal force F. As with groove 123*c*, the rail 223*c* may have an angle $\Theta_{2c}$ less than 35 degrees, greater than 65 degrees up to and including about 90 degrees (i.e., generally perpendicular to the centrifugal force F). In the illustrated embodiment, the centrifugal force is generally along the longitudinal axis of base 101*c*

Rail 223*c* is shown as being generally U-shaped with an inner surface 225*c* and an upper and lower surface 227*c* and 229*c*. Inner surface 225*c* is generally perpendicular to upper and lower surfaces 227*c* and 229*c* and upper and lower surfaces 227*c* and 229*c* are generally parallel to each other. The surfaces 225*c*, 227*c*, and 229*c* bear on surfaces 125*c*, 127*c*, and 129*c* of base 101*c* as the tip 201 engages the material 14*c* to be shredded. The shape of the rail 223*c* is not intended to be limiting as alternative shapes are possible. For example, the rail may be generally triangular, or convex and the upper and lower surfaces may converge toward each other as they extend toward the rear end 207*c*.

Figure 8:
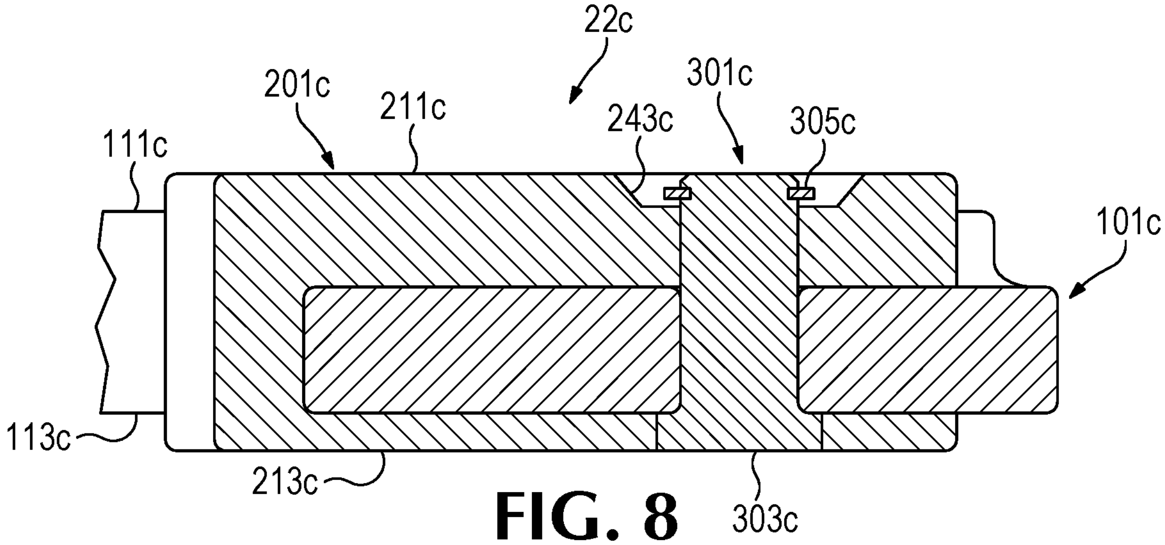
FIG. 8 is a cross sectional view of the multi piece hammer shown in FIG. 5 taken along lines 8-8 in FIG. 7.
Figure 9:
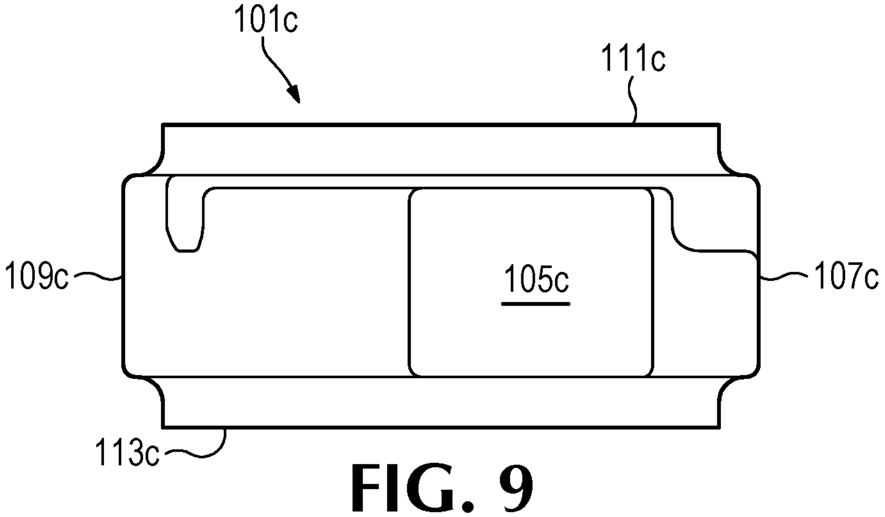
FIG. 9 is a bottom view of the base of the hammer shown in FIG. 5.

To assemble tip 201*c* on base 101*c*, tip 201*c* with rail 223*c* is aligned with groove 123*c* in base 101*c*. The tip 201*c* is then slid onto base 101*c* until bottom bearing surface 137*c* of the base 101*c* abuts the bottom bearing surface 237*c* of tip 201*c*. At this point opening 133*c* of base 101*c* aligns with opening 233*c* of base 201*c*. A main body 303*c* of retainer 301*c* passes through opening 233*c* in side surface 213*c* of tip 201*c* and continues into opening 133*c* in base 101*c* until the leading end of the main body 303*c* passes into the recess 243*c* in sidewall 211*c* of tip 201*c* (FIG. 8). A securement mechanism 305*c* is affixed to the end of main body 303*c* of retainer 301*c*.

Many types of retainers are possible to hold tip 201*c* to base 101*c*. For example, retainer 301*c* may consist of a main body 303*c* and a securement mechanism 305*c*. The main body 303*c* may be, for example, a bolt and the securement mechanism may be, for example, a lock washer, nut, or cotter pin. Alternative locks may pivot, slide, rotate, or otherwise moved into position so that a first portion of the lock contacts the tip and a second portion of the tip contacts the base to secure the tip to the base.

In an alternative embodiment shown in FIGS. 21-25, a multi piece hammer 22*d* is provided with a base 101*d* and tip 201*d* that are similar in many ways to hammer 22*c* with many of the same benefits and purposes. The following discussion focuses on the differences and does not repeat all the similarities that apply to hammer 22*d*. For example hammer 22*d* is provided with a retainer 301*d* similar to the retainer disclosed in US Patent publication 2013-0174453 filed Jul. 12, 2012 incorporated herein by reference.

Retainer 301*d* includes a mounting component or collar 322*d* and a retaining component or pin 320*d*. Collar 322*d* fits in opening 133*d* of base 101*d* and lugs 336*d*, 337*d*, and 338*d* of collar 322*d* engage against shoulders 171*d*, 173*d*, and 175*d* of opening 133*d* of base 101*d* to mechanically hold collar 322*d* in opening 133*d* and effectively prevent inward and outward movement during shipping, storage, installation and/or use of base 101*d*. Collar 322*d* includes a bore or opening 323*d* with threads 358*d* for receiving pin 320*d* with matching threads 354*d*. The collar could be secured to the base in other ways. The collar could alternatively be omitted and threads or partial threads formed in opening 133*d*. In the illustrated embodiment, a retainer 324*d*, preferably in the form of a retaining clip, is inserted in opening 133*d* with collar 322*d* to prevent disengagement of the collar 322*d* from base 101*d*. Preferably, collar 322*d* and retainer 324 are inserted at the time of manufacturing of base 101*d* and never need to be removed from the base 101*d*. Nevertheless, if desired, collar 322*d* and retainer 324 could be removed at any time. Openings 133*d* and 233*d* are adapted to receive retainer 301*d* to secure the tip 201*d* to the base 101*d*. Alternatively, the collar could be secured in the tip, e.g., in the rail.

Pin 320*d* preferably includes a head 347*d* and a shank 349*d*. Shank 349*d* is formed with threads 354*d* or another means for positively engaging the collar 322*d*. Threads 354*d* extend along a portion of its length from head 347. Pin end 330*d* is preferably unthreaded for receipt into opening 233*d* in rail 223*d* of tip 201*d* to prevent tip 201*d* from sliding off of base 101*d*.

Figure 24:
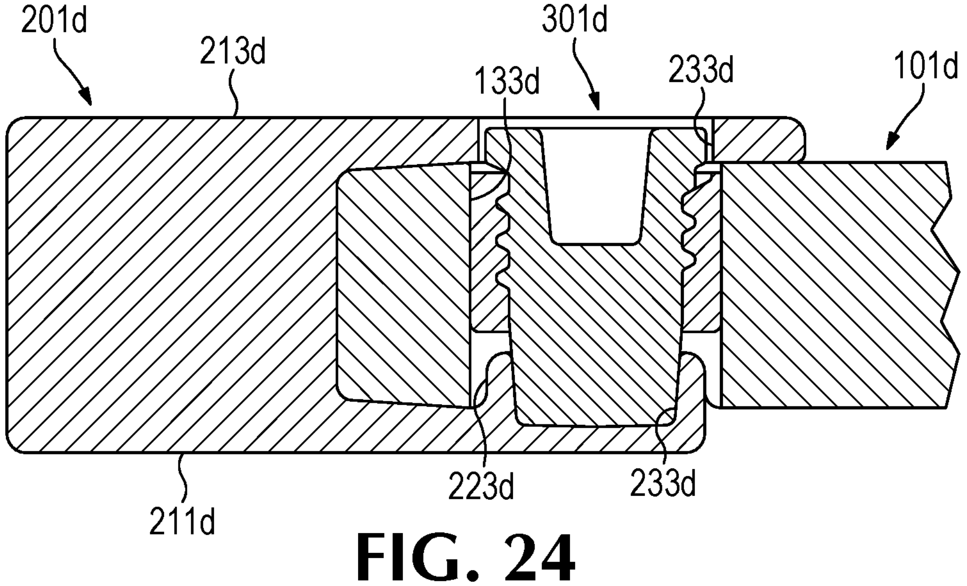
FIG. 24 is a cross sectional view of the hammer taken along lines 24-24 in FIG. 21.
Figure 25:
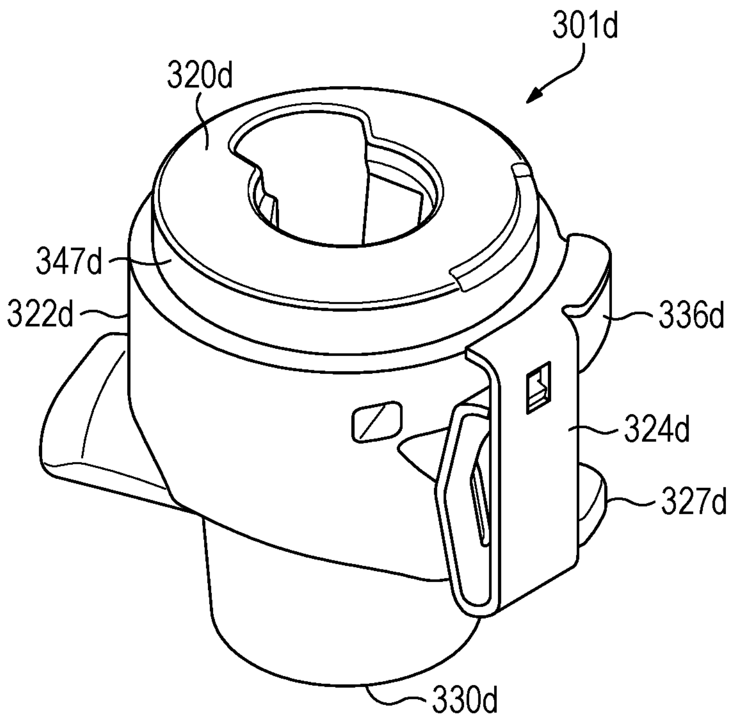
FIG. 25 is a perspective view of the retainer shown in FIG. 21.

To install tip 201*d* on base 101*d* the collar 322*d* is first installed in opening 133*d*. As discussed above, the collar 322*d* is preferably installed at the time of manufacture and will not need to be reinstalled in the base 101*d* or the base may be provided with threads in opening 133*d* so that a collar 322*d* is not needed. Tip 201*d* is slid onto base 101*d* until the bottom bearing surfaces of the base abut the bottom bearing surfaces of the tip. Pin 320*d* is installed into collar 322*d* from side surface 213*d* of tip 201*d* so that pin end 330*d* is the leading end and pin threads 354*d* engage collar threads 358*d*. A hex socket (or other tool-engaging formation) 348*d* is formed in head 347*d*, at the trailing end, for receipt of a tool to turn pin 320*d* in collar 322*d*. Pin 320*d* is rotated until the pin end 330*d* engages the opening 233*d* within the rail 223*d* of tip 201*d* as shown in FIG. 24.

Figure 26:
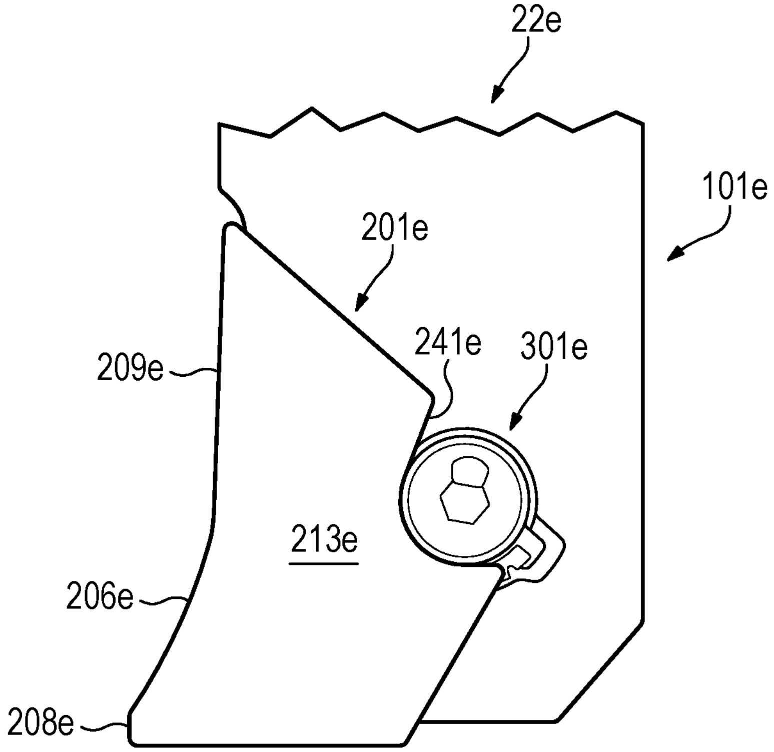
FIG. 26 is a side view of another alternative multi piece hammer in accordance with the present invention.
Figure 27:
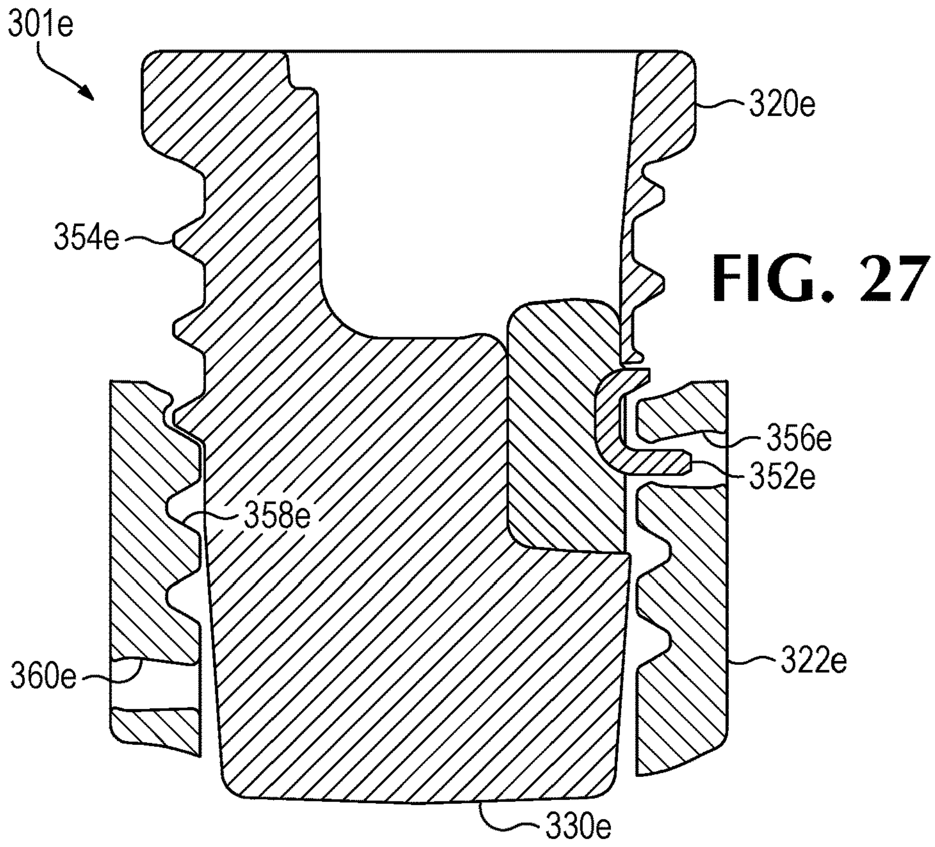
FIGS. 27 and 28 are a cross sectional views of the retainer shown in FIG. 26 wherein the retainer is secured in both release and hold positions.
Figure 28:
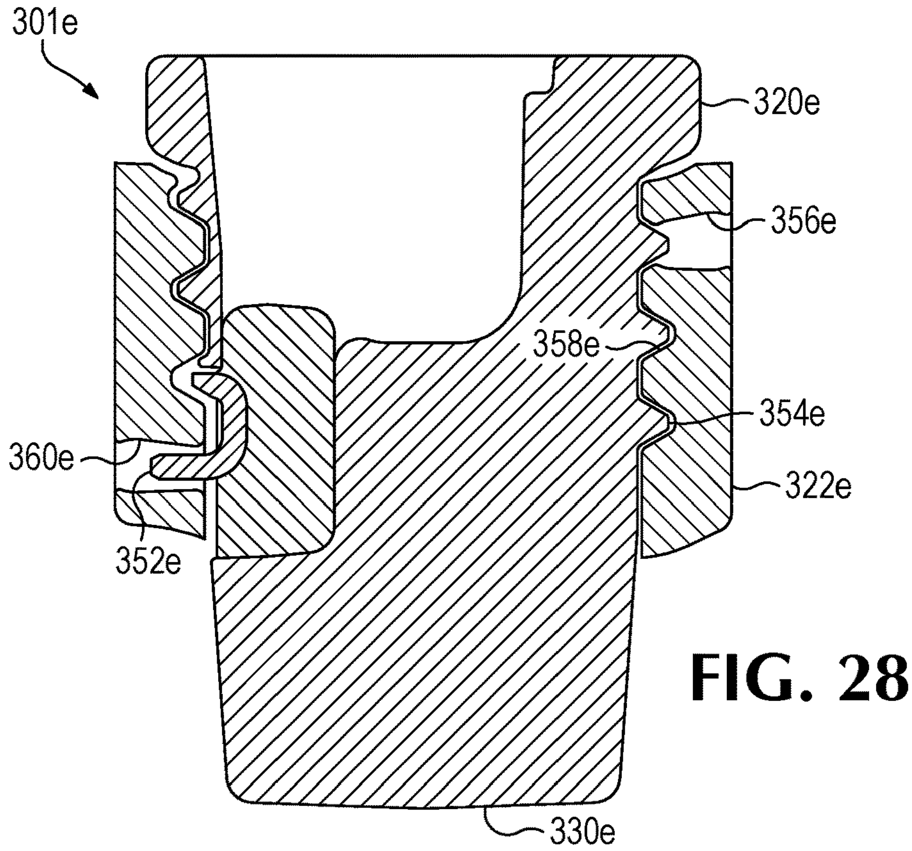

In another embodiment shown in FIGS. 26 to 28, a multi piece hammer 22*e* is provided with a base 101*e* and tip 201*e* that are similar in many ways to hammer 22*c* and hammer 22*d* with many of the same benefits and purposes. However, in this embodiment, tip 201*e* has a front leading surface 209*e* with a sloped surface 206*e* that extends forward of base 101*e* and ends with a forward most impact surface 208*e*. Tip 201*c* or 201*d* could be provided with a front leading surface similar to tip 201*e*. As seen in FIG. 26, sidewall 213*e* of tip 201*e* does not have a protrusion similar to the protrusion 241*c* of hammer 22*c* in FIG. 16. Instead, tip 201*e* has a recess 241*e*. Recess 241*e* is preferably large enough so that retainer 301*e*, which is similar to retainer 301*d*, may be left installed in a release position so that the tip 201*e* can be slide onto the base 101*e* while the retainer is in the base 101*e*. The retainer is preferably secured to the base by mechanical means at the time of manufacture so that it can be shipped, stored and installed as an integral unit with the base, i.e., with the retainer in a "ready to install" position.

The use of recess 241*e* allows the retainer 301*e* to only extend into one side of the tip 201*e*. Tip 201*e* preferably has an opening in a rail in tip 201*e* for receiving a pin and may be, for example, similar to opening 233*d* in tip 201*d* so that the tip has an opening extending from the cavity to a distance short of the exterior surface of the tip 201*d*. The retainer 301*e* will preferably only extend into an interior surface within the cavity of the tip 201*e*. In the illustrated embodiment, the retainer does not extend completely through any part of the tip and does not protrude through the exterior surface of the tip.

Retainer 301*e* has a threaded pin 320*e* and collar 322*e*. Threaded pin 320*e* preferably includes a biased latching tooth or detent 352*e*, biased to protrude beyond the surrounding thread 354*e*. A corresponding outer pocket or recess 356*e* is formed in the thread 358*e* of collar 322*e* to receive detent 352*e*, so that threaded pin 320*e* latches into a specific position relative to collar 322*e* when latching detent 352*e* aligns and inserts with outer pocket 356*e*. The engagement of latching detent 352*e* in outer pocket 356*e* holds threaded pin 320*e* in a release position relative to collar 322*e*, which holds pin 320*e* outside of the rail of tip 201*e*. Preferably, latching detent 352*e* is located at the start of the thread on threaded pin 320*e*, near the pin end 330*e*. Outer pocket 356*e* is located approximately ½ rotation from the start of the thread on collar 322*e*. As a result, pin 320*e* will latch into release position after approximately ½ turn of pin 320*e* within collar 322*e*. Further application of torque to pin 320*e* will squeeze latching detent 352*e* out of outer pocket 356*e*. An inner pocket or recess 360*e* is formed at the inner end of the thread of collar 322*e*. Preferably, the thread 358*e* of collar 322*e* ends slightly before inner pocket 360*e*. This results in an increase of resistance to turning pin 320*e* as pin 320*e* is threaded into collar 322*e*, when latching detent 352*e* is forced out of thread 358*e*. This is followed by a sudden decrease of resistance to turning pin 320*e*, as latching detent 352*e* aligns with and pops into the inner pocket. In use, there is a noticeable click or "thunk" as pin 320*e* reaches an end of travel within collar 322*e*. The combination of the increase in resistance, the decrease in resistance, and the "thunk" provides haptic feedback to a user that helps a user determine that pin 320*e* is fully latched in the proper service position with the pin end 330*e* extending into an opening in a rail similar to opening 233*d*. This haptic feedback results in more reliable installations of base and tip using the present combined collar and pin assembly, because an operator is trained to easily identify the haptic feedback as verification that pin 320*e* is in the desired position to retain the tip 201*e* on base 101*e*. Other kinds of detents could be used that latch in other ways such as to engage the inner surface of the opening in base 101*e*. Features of latching retainer 301*e* can be used with hammer 22*d* and retainer 301*d* to provide additional benefits. For example, retainer 301*d* may be provided with the latching detent 352*e* and inner pocket 360*e* to latch the retainer in a locked position when in use.

Figure 49:
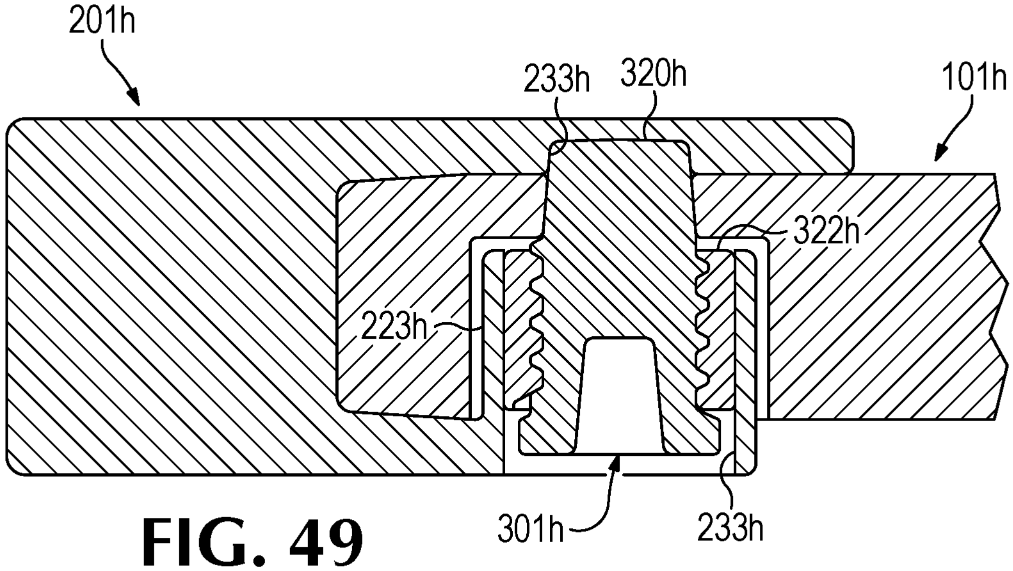
FIG. 49 is a cross sectional view of another alternative multi piece hammer in accordance with the present invention. The retainer is shown in a hold position where the retainer maintains the tip on the base.
Figure 50:
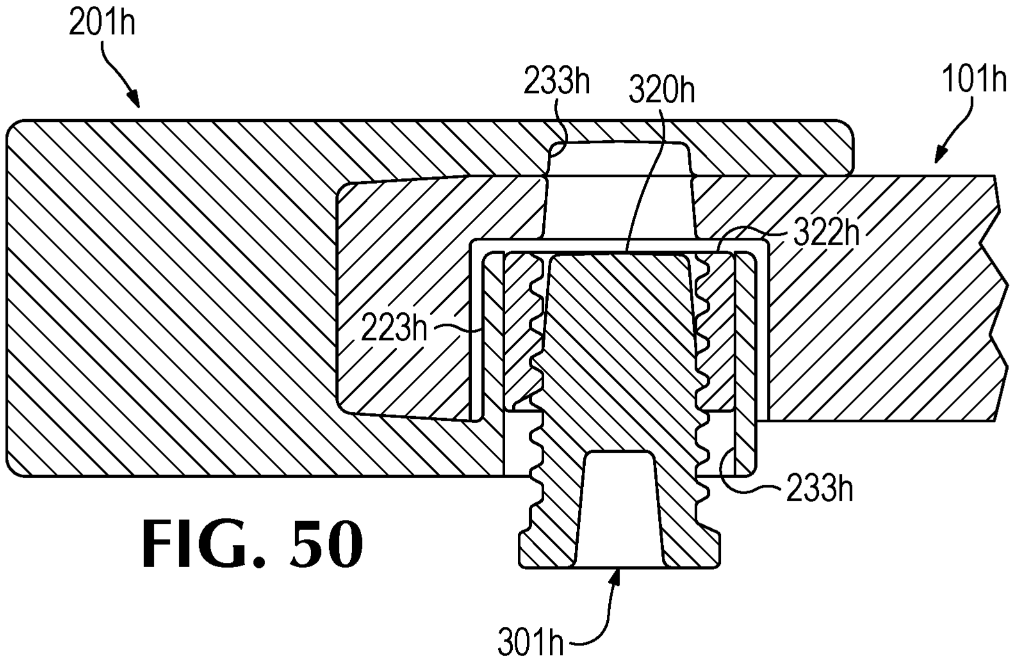
FIG. 50 is a cross sectional view of the multi piece hammer shown in FIG. 49 with the retainer in a release position where the tip can be installed and removed from the base.

In an alternative embodiment shown in FIGS. 49 and 50, a retainer 301*h* similar to retainer 301*d* or 301*e* may be secured to the tip 201*h* by mechanical means at the time of manufacture so that it can be shipped, stored and installed as an integral unit with the tip 201*h*, i.e., with the retainer 301*h* in a "ready to install" position (i.e., in a release position as shown in FIG. 50). The retainer 301*h* may be integrally connected to the tip 201*h*. A collar 322*h* similar to 322*d* and 322*e* may be, for example, secured within an opening 233*h* in a side of tip 201*h*. The collar 322*h* may be, for example, secured in a rail 223*h* similar to rail 223*c* and a threaded pin 320*h* similar to 320*d* and 320*e* may be mechanically secured to the collar 322*h* in a release position where the tip 201*h* can be installed on the base 201*h*. Once the tip 201*h* is installed on the base 101*h* the pin 320*h* may be moved to a hold position, as shown in FIG. 49, where the pin 320*h* abuts a surface on the base 101*h* to maintain the tip 201*h* on the base 101*h*.

Figure 51:
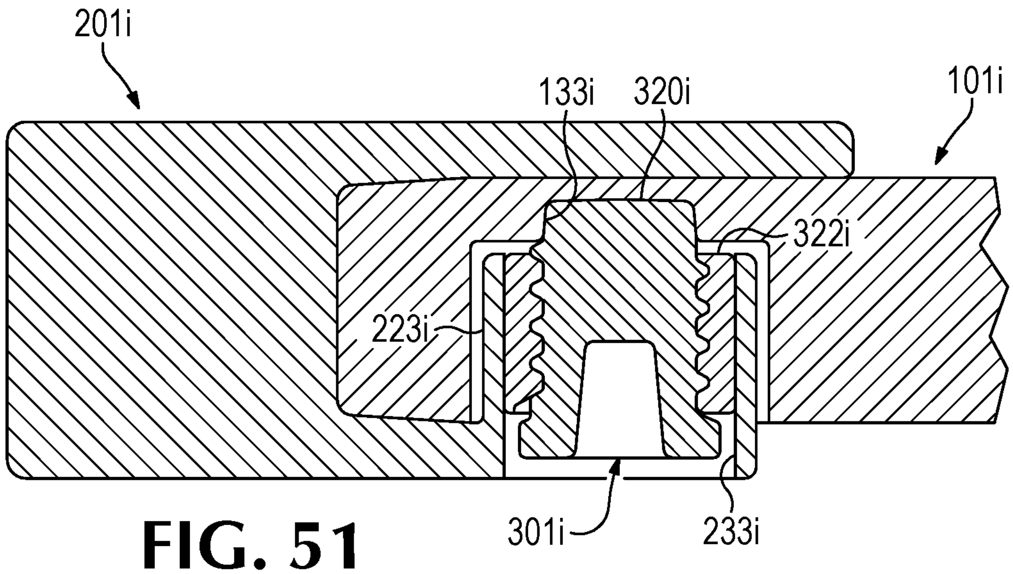
FIG. 51 is a cross sectional view of another alternative multi piece hammer in accordance with the present invention. The retainer is shown in a hold position where the retainer maintains the tip on the base.
Figure 52:
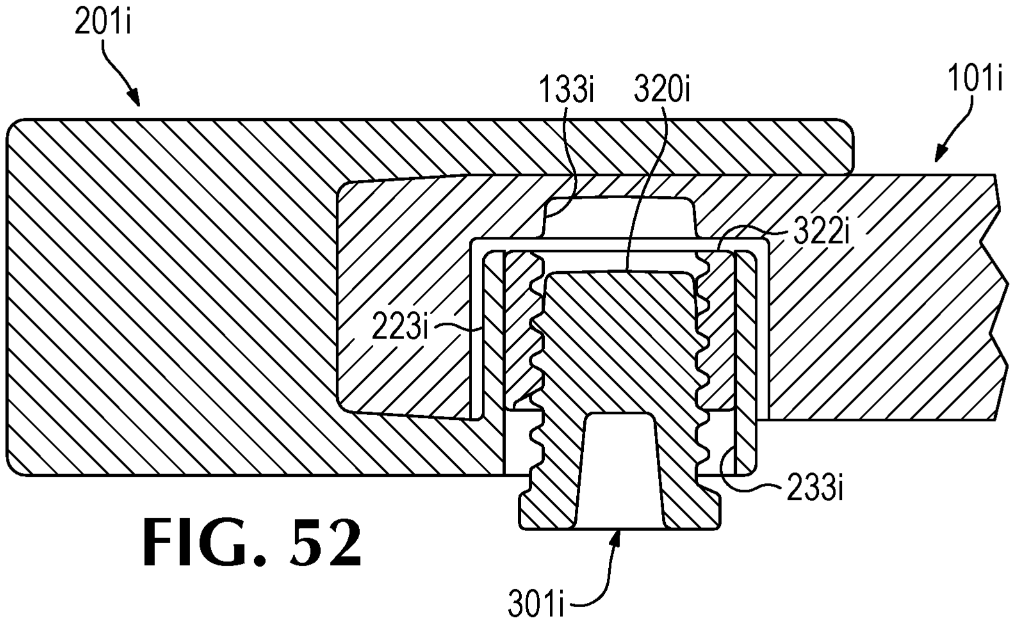
FIG. 52 is a cross sectional view of the multi piece hammer shown in FIG. 51 with the retainer in a release position where the tip can be installed and removed from the base.

In an alternative embodiment shown in FIGS. 51 and 52, base 101*i* and tip 201*i* are similar to base 101*h* and tip 201*i*. The tip 201*i* has a collar 322*i* that is installed in a rail 223*i*. The base 101*i*, however, preferably does not have a through hole for receiving the threaded pin 320*i*. The base 101*i* has a recess 133*i* for receiving the threaded pin 320*i*. In addition opening 233*i* only extends into the side of the tip 201*i* with the rail 223*i*. Like retainer 301*h*, retainer 301*i* may be installed in tip 201*i* at the time of manufacture and be shipped, stored and installed as an integral unit with the tip 201*i*, i.e., with the retainer 301*i* in a "ready to install" position (i.e., in a release position as shown in FIG. 52). Once the tip 201*i* is installed on the base 101*i* the pin 320*i* may be moved to a hold position, as shown in FIG. 51, where the pin 320*i* abuts a surface of the recess 133*i* of base 101*i* to maintain the tip 201*i* on the base 101*i*.

Figure 29:
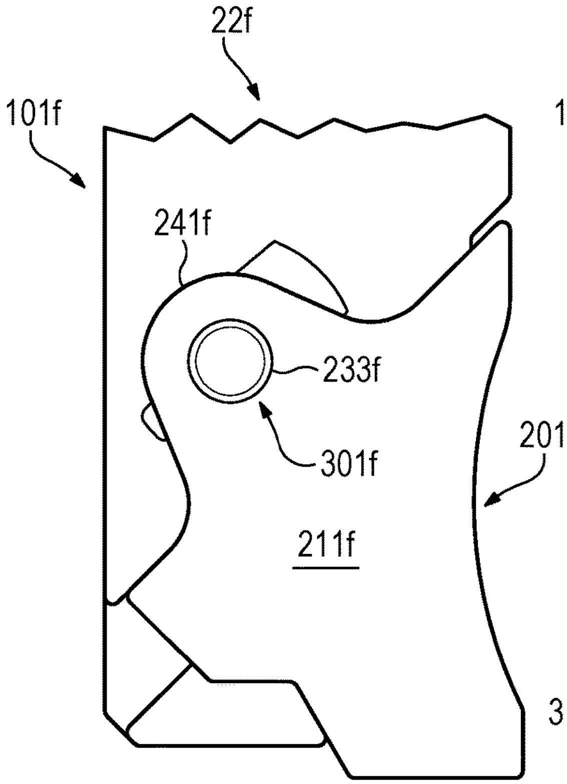
FIG. 29 is a side view of an alternative multi piece hammer in accordance with the present invention.
Figure 30:
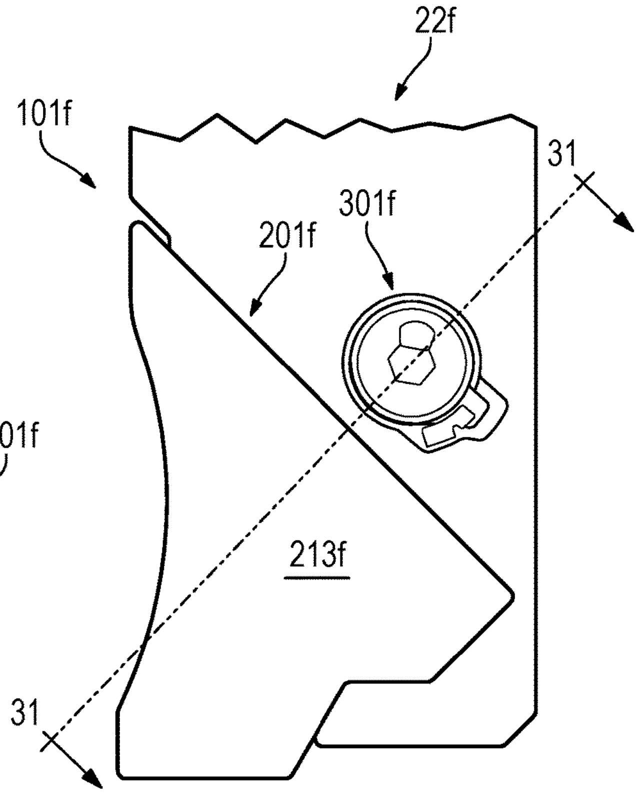
FIG. 30 is another side view of the hammer shown in FIG. 29.
Figure 31:
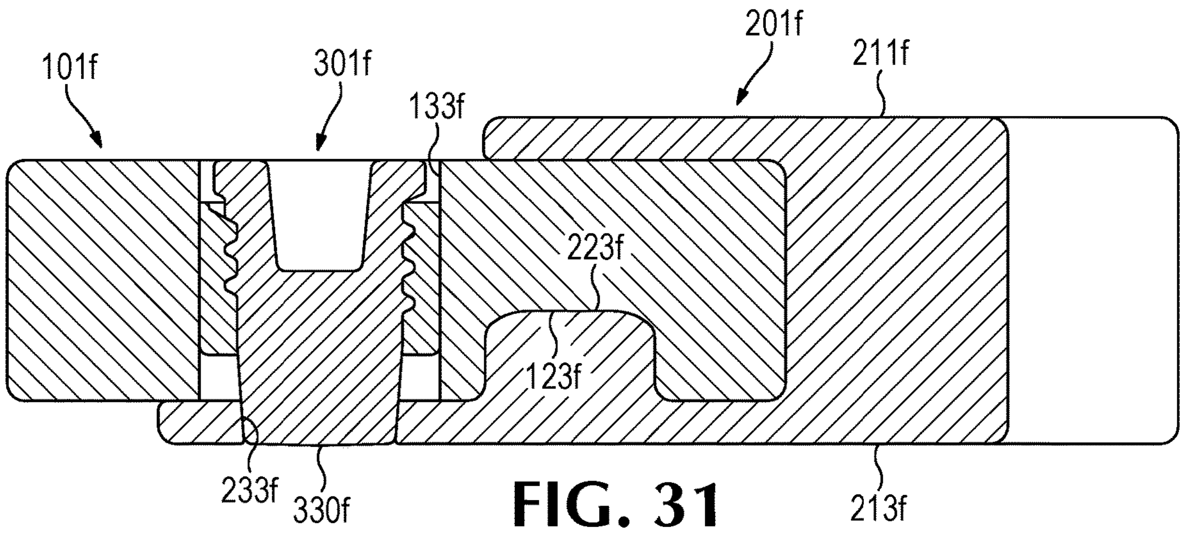
FIG. 31 is a cross sectional view of the hammer shown in FIG. 29 taken along lines 31-31 in FIG. 30.
Figure 32:
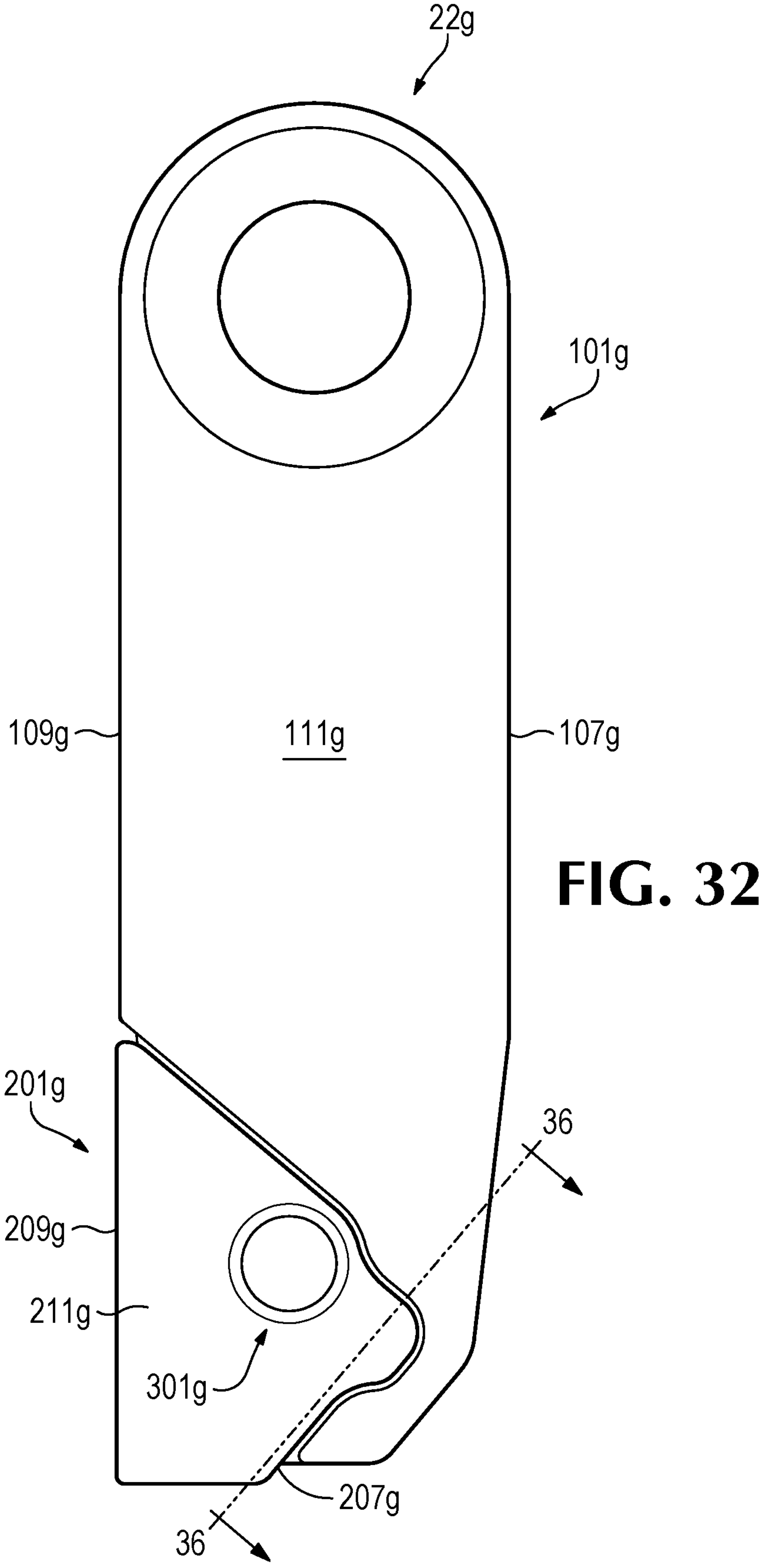
FIGS. 32 and 33 are side views of another alternative multi piece hammer in accordance with the present invention.
Figure 33:
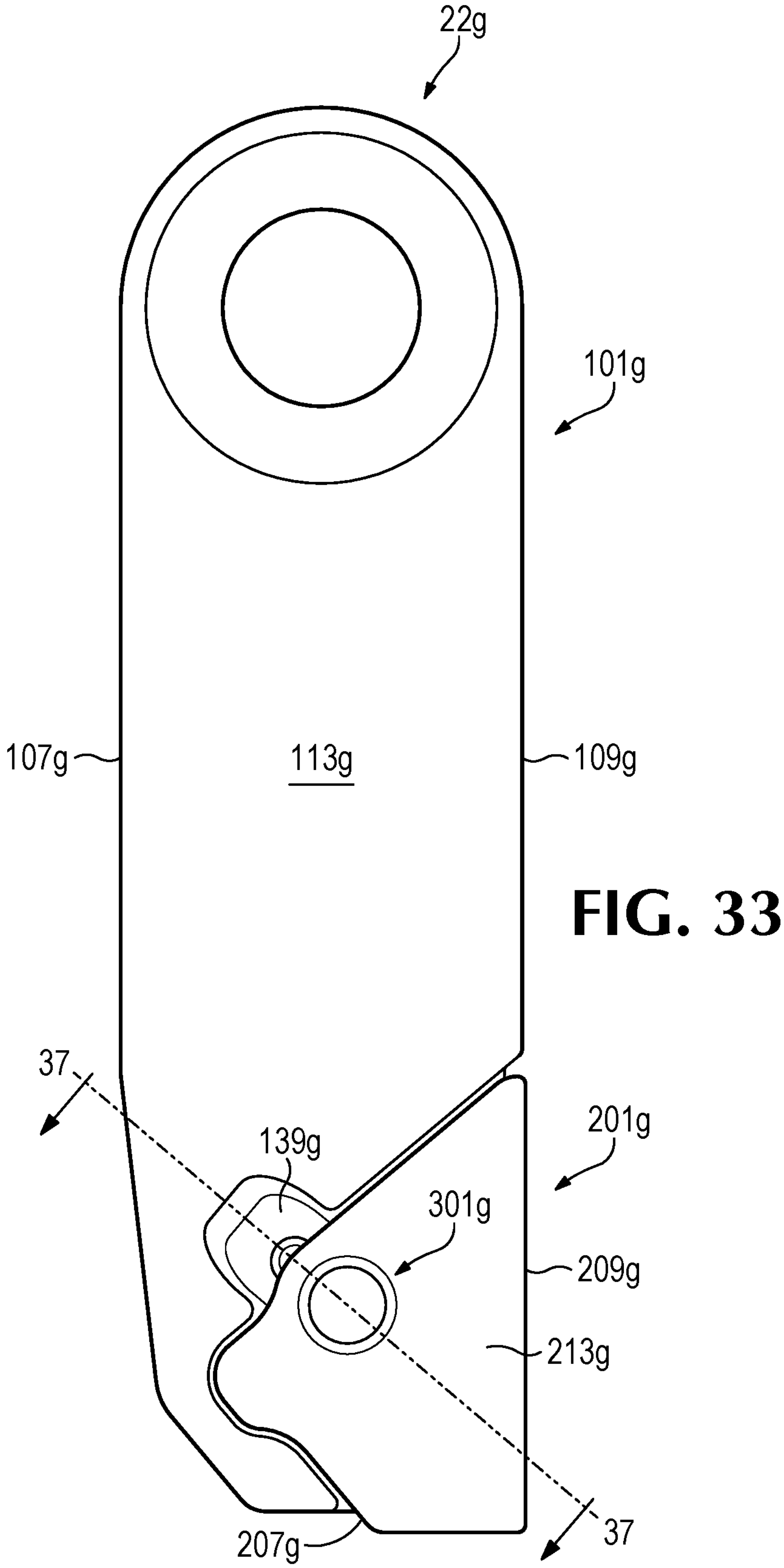
Figure 34:
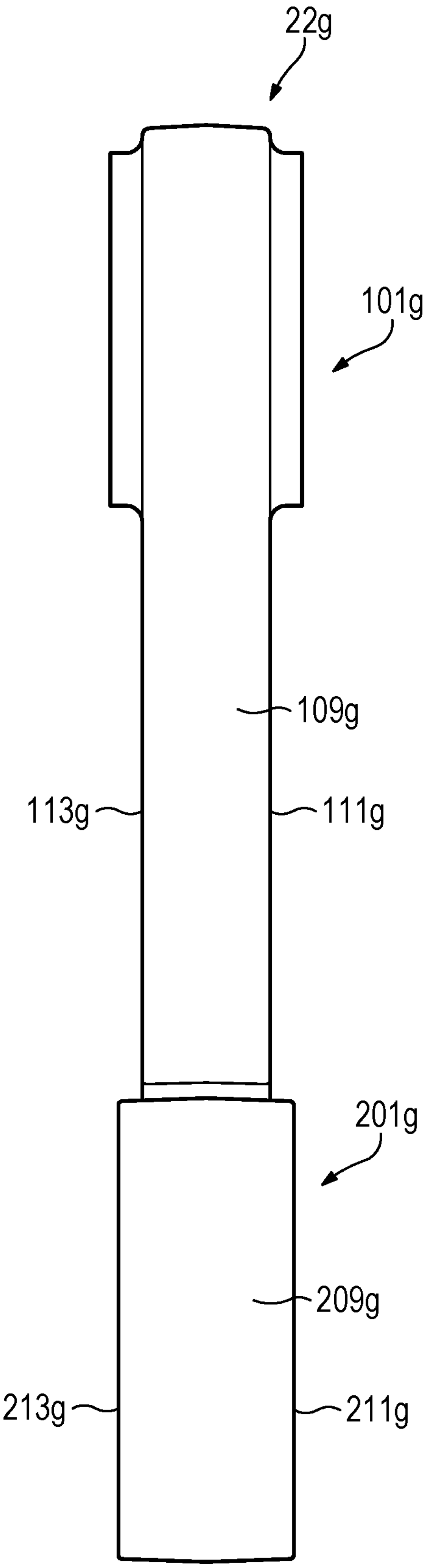
FIG. 34 is a front view of the multi piece hammer shown in FIGS. 32 and 33.
Figure 35:
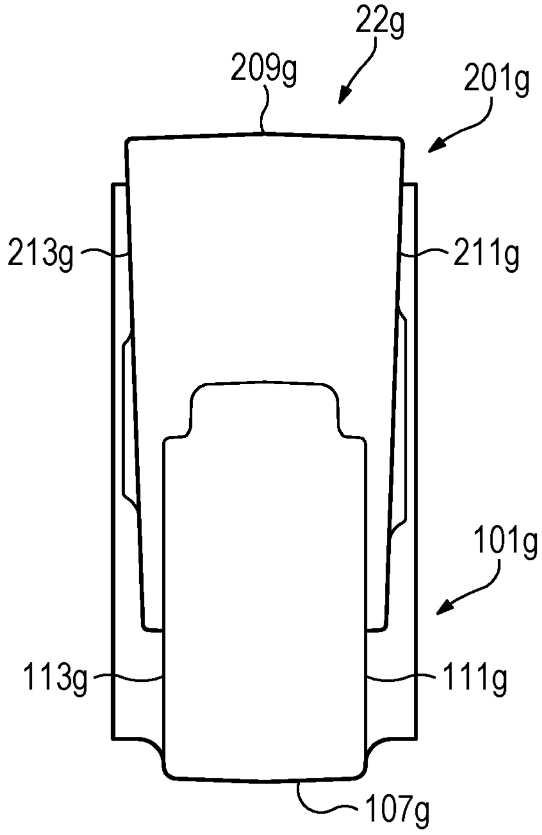
FIG. 35 is a bottom view of the multi piece hammer shown in FIGS. 32 and 33.

In another embodiment shown in FIGS. 29 to 31, a multi piece hammer 22*f* is provided with a base 101*f* and tip 201*f* that are similar in many ways to hammers 22*c*, 22*d* and 22*e* with many of the same benefits and purposes. However, in this embodiment opening 133*f* in base 101*f* does not extend through groove 123*f*. Opening 133*f* is located above groove 123*f*. Likewise, opening 233*f* is above rail 223*f* in tip 201*f*. Sidewall 211*f* is provided with a protrusion 241*f* and opening 233*f* extends through the protrusion. Sidewall 213*f* of tip 201*f* does not extend as high as sidewall 211*f*. Tip 201*f* is installed on base 101*f* in a similar fashion as tip 201*e* is installed on base 101*e* in hammer 22*e*. First the retainer 301*f* is secured in a release position within base 101*f* so that pin end 330*f* of pin 320*f* does not protrude outside opening 133*f*. Next, tip 201*f* is slide onto base 101*f* and retainer 301*f* is rotated to a locked position where pin end 330*f* protrudes into opening 233*f* in tip 201*f*.

In another embodiment shown in FIGS. 32-48, a multi piece hammer 22*g* is provided with a base 101*g* and tip 201*g* that are similar in many ways to hammers 22*c*, 22*d*, 22*e*, and 22*f* with many of the same benefits and purposes. In this embodiment, base 101*g* has a recess 139*g* in sidewall 113*g*. Once the tip 201*g* has been slid onto the base 101*g*, recess 139*g* and sidewall 247*g* of tip 201*g* form a pocket 141*g* to receive a securement mechanism 305*g*.

Groove 123*g* is shown as being half of a dovetail joint that mates with rail 223*g* that forms the other half of the dovetail joint. Groove 123*g* has an inner surface 125*g* and an upper and lower surface 127*g*, 129*g*. Upper and lower surfaces 127*g* and 129*g* converge toward each other as they extend from inner surface 125*g*. Upper and lower surfaces 127*g* and 129*g* are shown as converging toward each other with an angle $\alpha_g$. In the illustrated embodiment, the angle of convergence $\alpha_g$ is an acute angle, however the angle of convergence could be greater or the upper and lower surfaces 127*g*, 129*g* could have angles of convergence $\alpha_g$ that are different from each other. Similarly the rail 223*g* on tip 201*g* has a dovetail shape to form the other half of the dovetail joint. Rail 223*g* has an inner surface 225*g* and an upper and lower surface 227*g*, 229*g* to correspond to groove 123*g* (i.e., upper and lower surfaces 227*g* and 229*g* converge toward each other as they extend from inner surface 225*g*). Hammers 22*c*, 22*d*, 22*e*, and 22*f* may also have a groove and rail similar to hammer 22*g*.

Figure 36:
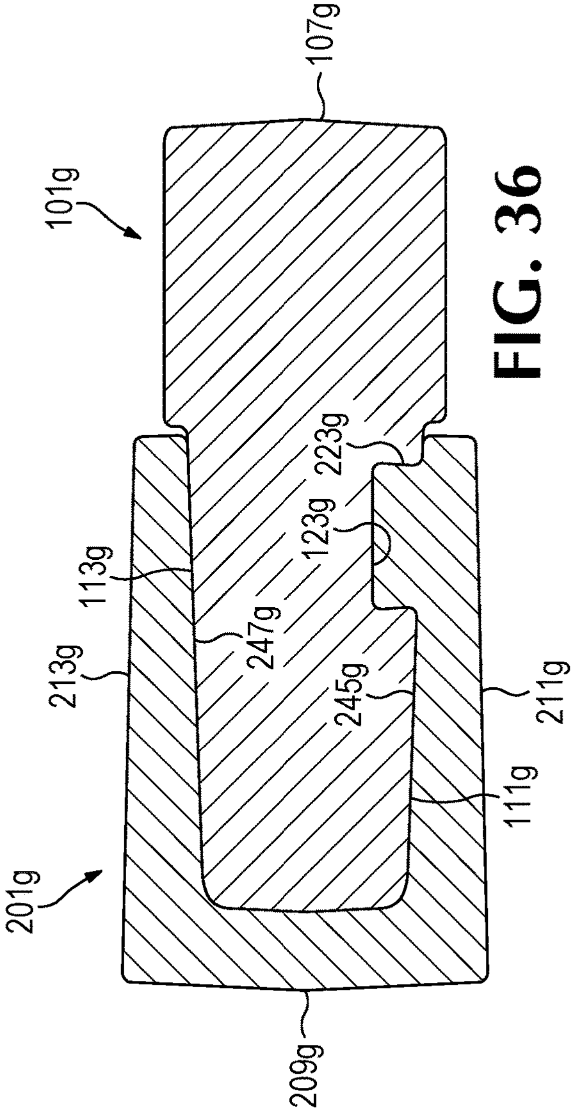
FIG. 36 is a cross sectional view of the multi piece hammer shown in FIGS. 32 and 33 taken along lines 36-36 in FIG. 32.
Figure 43:
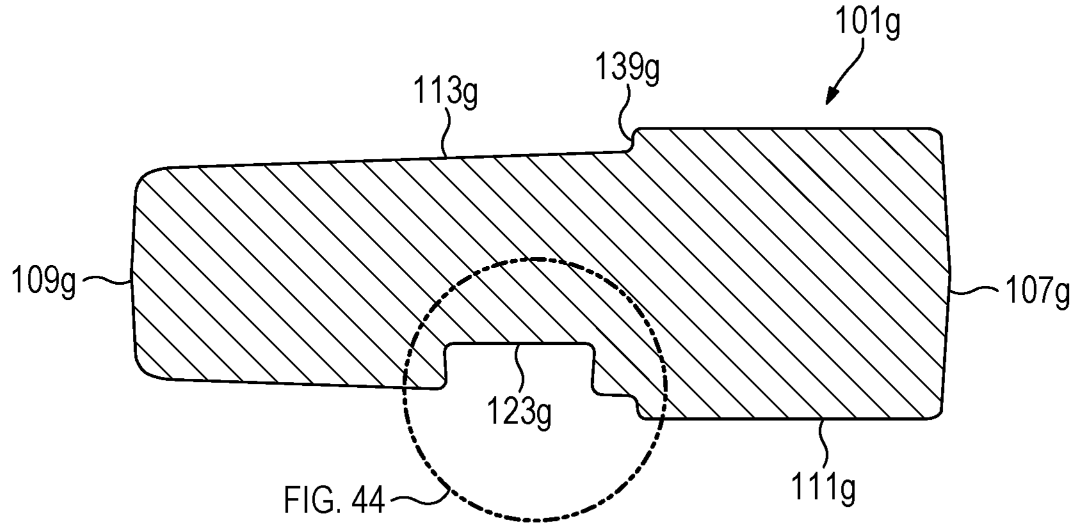
FIG. 43 is a cross sectional view of the base of the hammer shown in FIGS. 32 and 33 taken along lines 43-43 in FIG. 41.
Figure 44:
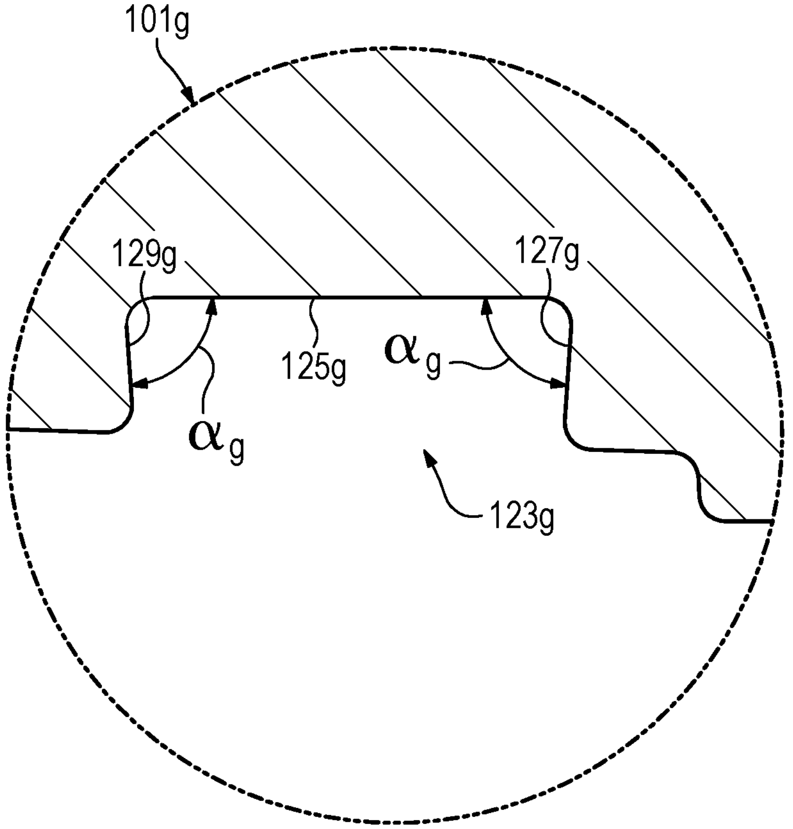
FIG. 44 is a detailed view of the base of the hammer shown in FIG. 43.
Figure 45:
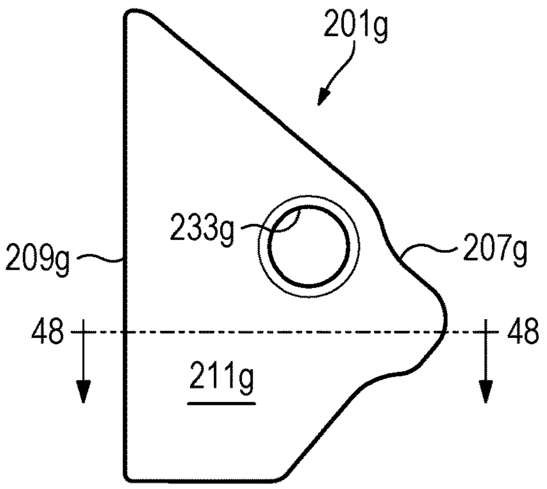
FIGS. 45 and 46 are side views of the tip of the hammer shown in FIGS. 32 and 33.
Figure 46:
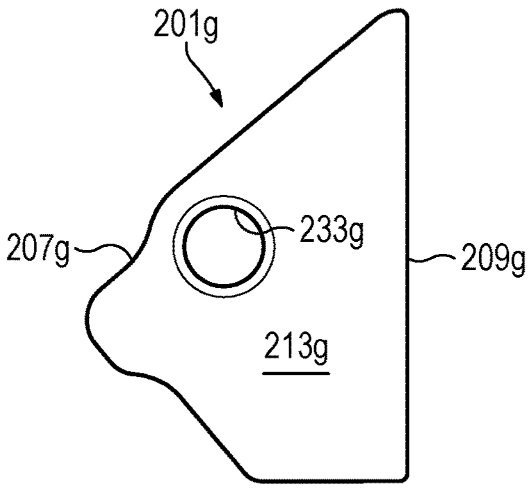
Figure 47:
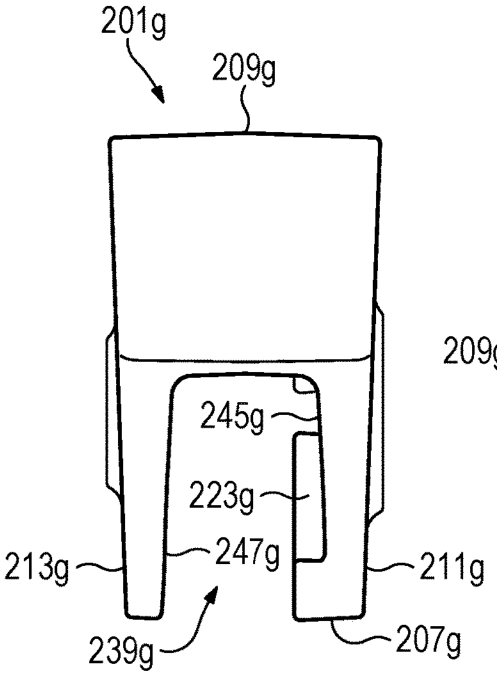
FIG. 47 is a bottom view of the tip of the hammer shown in FIGS. 32 and 33.
Figure 48:
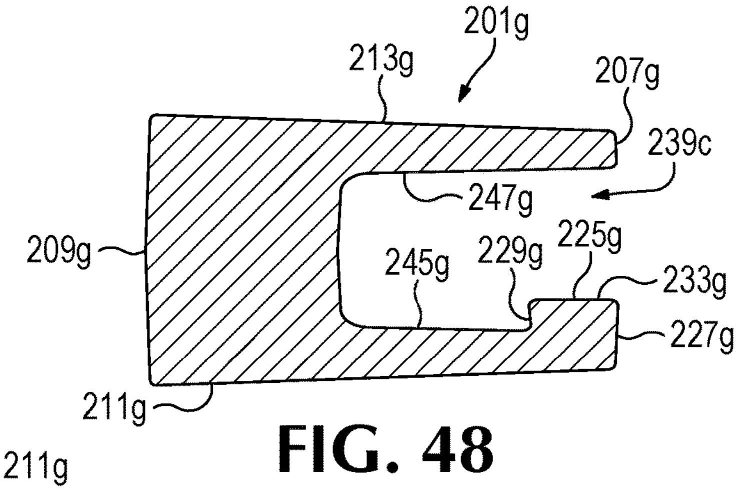
FIG. 48 is a cross section view of the tip of the hammer shown in FIGS. 32 and 33 taken along lines 48-48 in FIG. 45.

As seen in FIGS. 36 and 43, base 101*g* is tapered from the rear end 107*g* to the front end 109*g* along a plane normal to the angle $\theta_{1g}$ of groove 123*g* (i.e., sidewalls 111*g* and 113*g* converge toward each other as they extend forward toward front end 109*g*). Tapering the base from the rear end 107*g* to the front end 109*g* allows the tip 201*g* to have more wear material and strength while still maintaining the overall thickness of the hammer 22*g*. Tapering the base 101*g* along a plane normal to the angle $\theta_{1g}$ of groove 123*g* allows the tip 201*g* to be able to slide onto the base 101*g*. As seen in FIG. 36, sidewalls 245*g* and 247*g* within cavity 239*g* of tip 201*g* generally correspond to sidewalls 111*g* and 113*g* of base 101*g* (i.e., sidewalls 245*g* and 247*g* converge toward each other as they extend forward toward front end 209*g* along a plane normal to the angle $\theta_{1g}$ of groove 123*g* and rail 223*g*.) Hammers 22*c*, 22*d*, 22*e*, and 22*f* may also taper similar to hammer 22*g*.

The outer side surfaces 211*g* and 213*g* of tip 201*g* are tapered backward from the front end 209*g* to the rear end 207*g* (i.e., the side surfaces 211*g* and 213*g* converge toward each other as they extend from front end 209*g* toward rear end 207*g*). The front end 209*g* has a larger width than the rear end 207*g* and the rear end 207*g* is in the shadow of front end 209*g*. This general tapered shape helps minimize the wear that the rearward portions of the tip 201*g* experience. In addition, the larger front end 209*g* minimizes the wear the base 101*g* will experience. Tips 201*c*, 201*d*, 201*e*, and 201*f* may also have a rearward taper similar to tip 201*g*.

Figure 37:
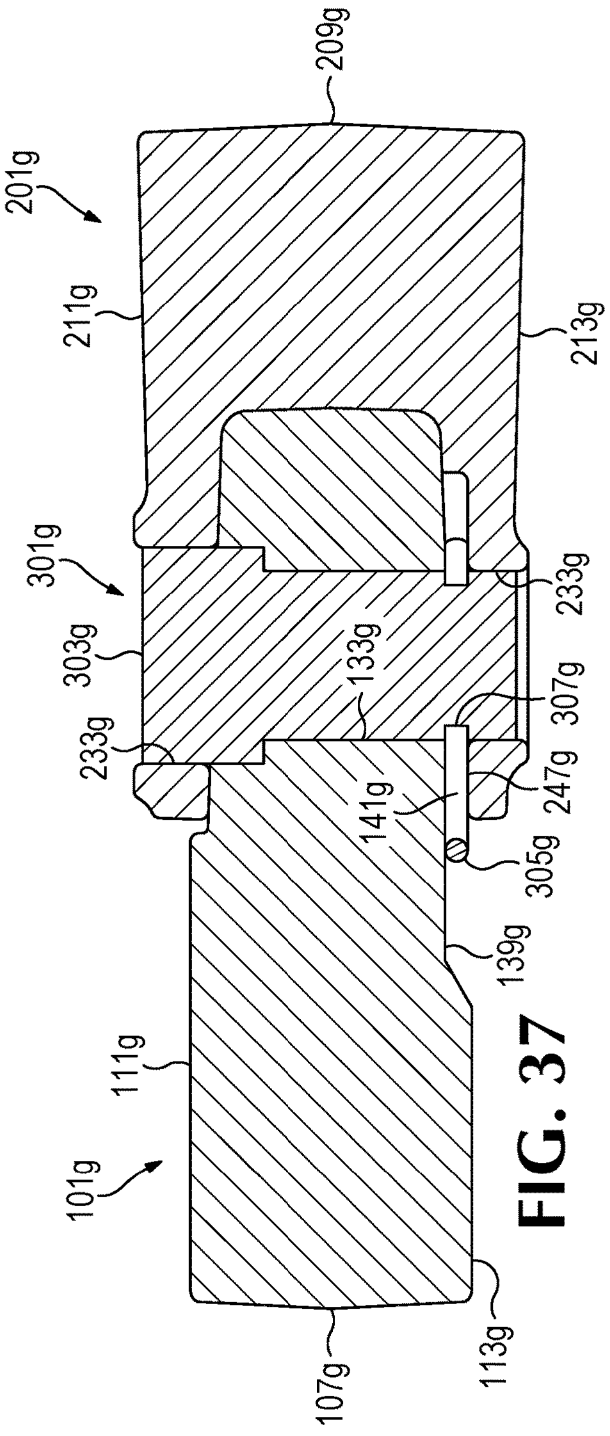
FIG. 37 is a cross sectional view of the multi piece hammer shown in FIGS. 32 and 33 taken along lines 37-37 in FIG. 33.
Figure 38:
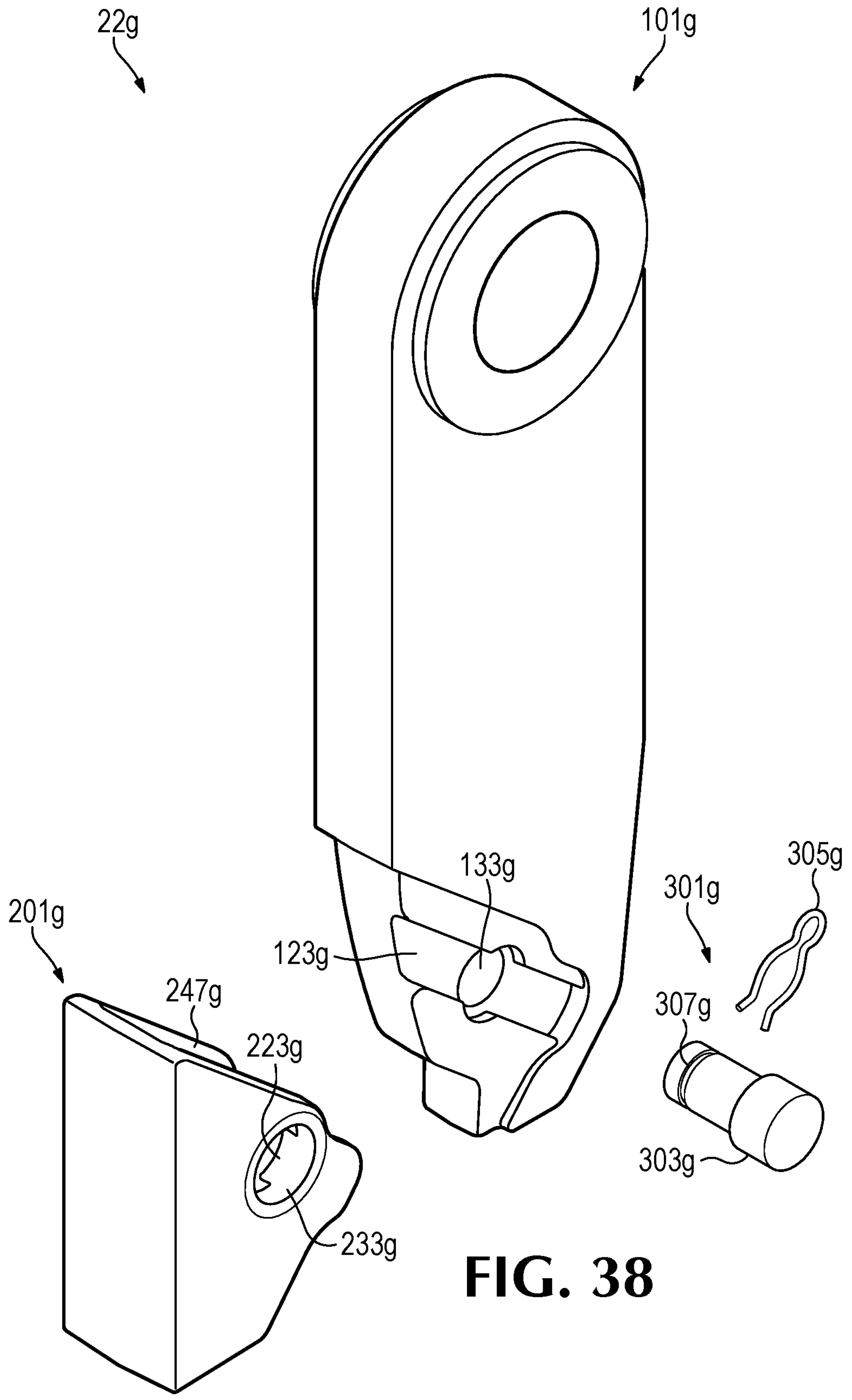
FIG. 38 is an exploded front perspective view of the hammer shown in FIGS. 32 and 33.
Figure 39:
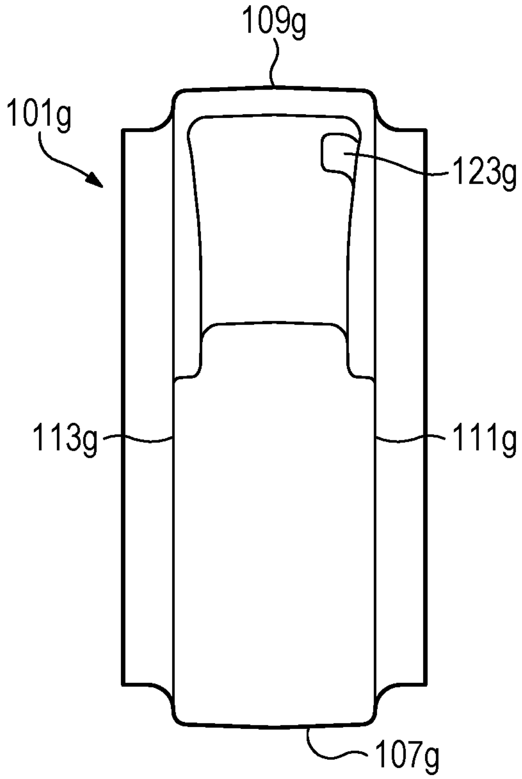
FIG. 39 is a bottom view of the shank of the hammer shown in FIGS. 32, 32, and 33.
Figure 40:
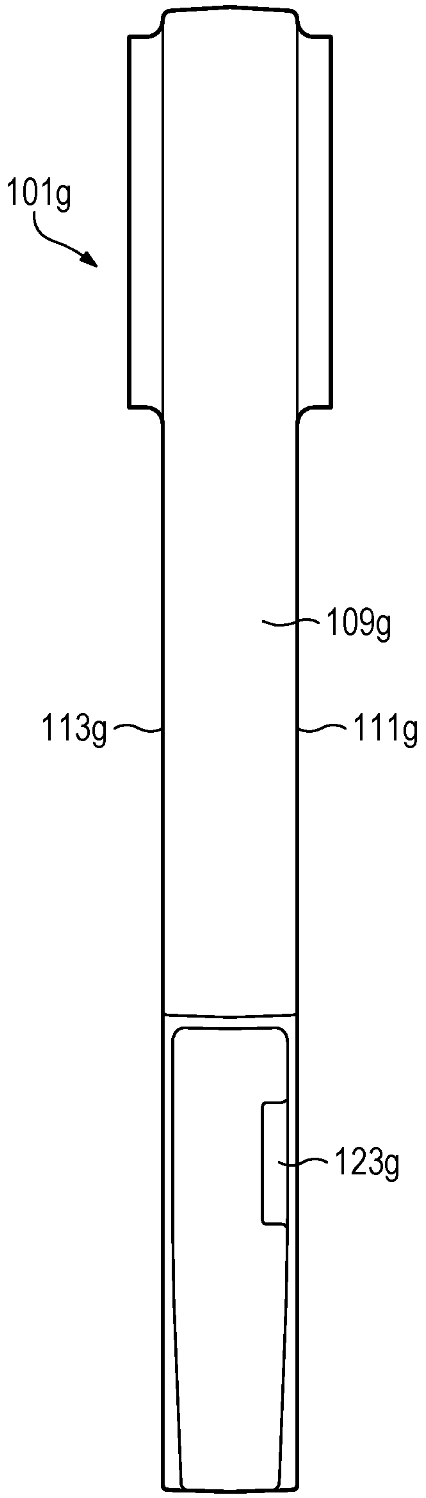
FIG. 40 is a front view of the base of the hammer shown in FIGS. 32 and 33.
Figure 41:
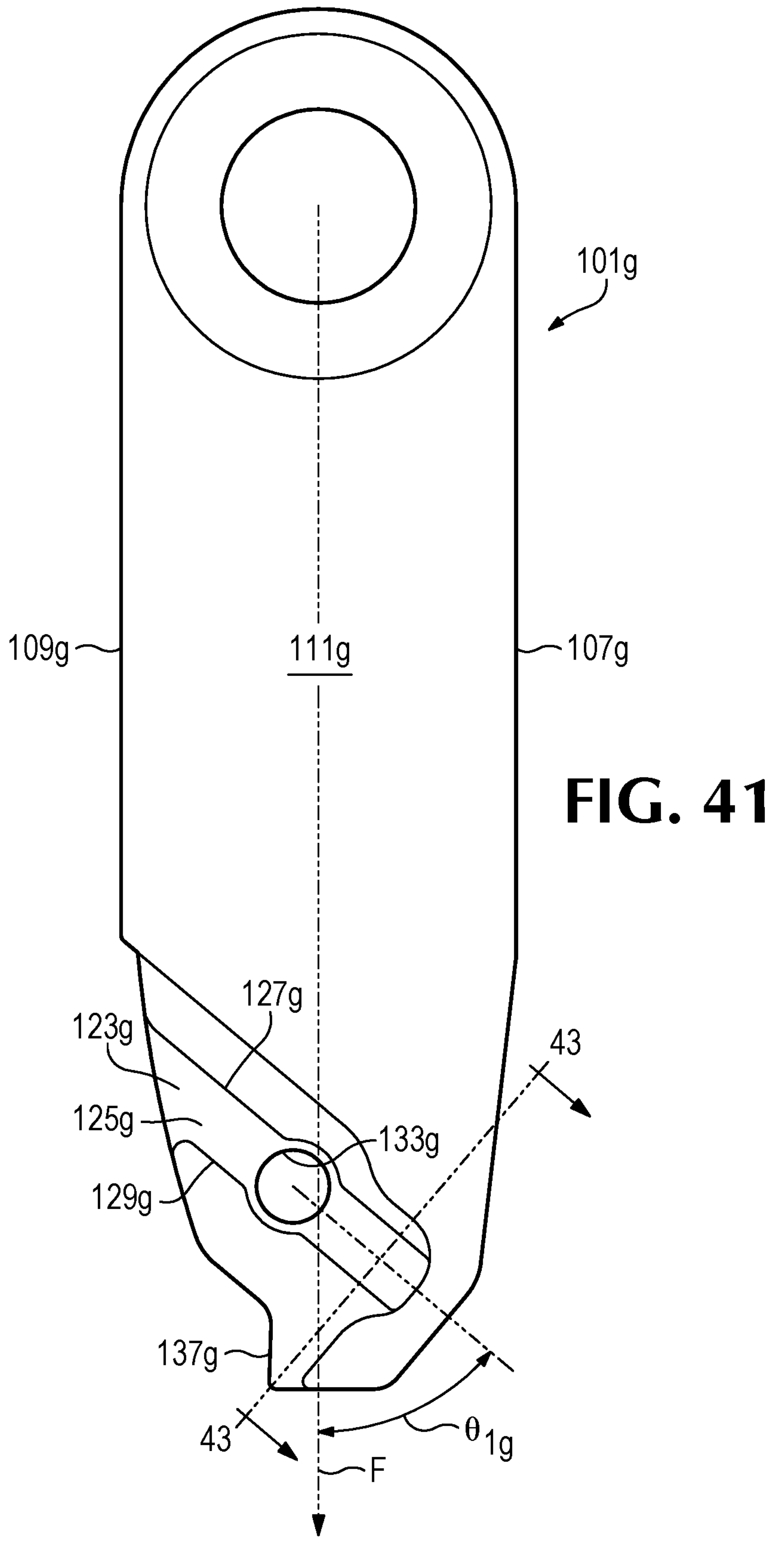
FIGS. 41 and 42 are side views of the base of the hammer shown in FIGS. 32 and 33.
Figure 42:
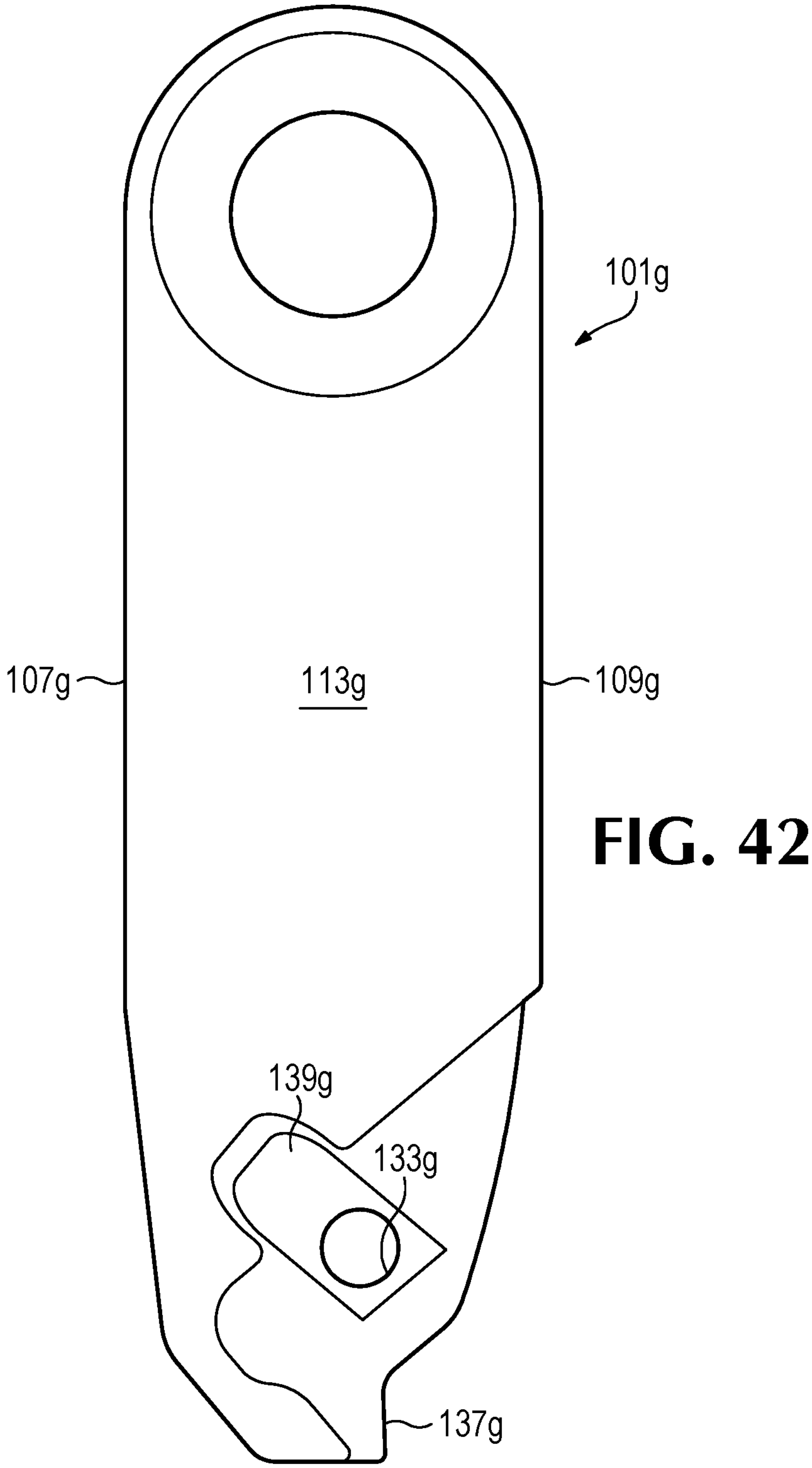

To assemble tip 201*g* on base 101*g*, tip 201*g* with rail 223*g* is aligned with groove 123*g* in base 101*g*. The tip 201*g* is then slid onto base 101*g* until bottom bearing surface 137*g* of the base 101*g* abuts the bottom bearing surface of tip 201*g*. At this point, opening 133*g* of base 101*g* aligns with opening 233*g* of base 201*g*. The main body 303*g* of retainer 301*g* passes through opening 233*g* in side surface 211*g* of tip 201*g* and continues into opening 133*g* in base 101*g* until the leading end of the main body 303*g* passes into the other end of the opening in sidewall 213*g* of tip 201*g* (FIG. 37). The securement mechanism 305*g* (in this example a hair pin clip) is slid into pocket 141*g* until the securement mechanism 305*g* engages groove 307 on the main body 303*g* of retainer 301*g*. Securement mechanism 305*g* is designed to resist minimal loads as the hammer impacts the material to be reduced. The retainer is secured to the base 101*g* and the opposite ends of the main body 303*g* engage the through opening 233*g* on both sides 211*g* and 213*g* of tip 201*g* to prevent the tip 201*g* from sliding off of the base 101*g*.

The above disclosure describes specific examples of hammers for use with material reducing equipment. The hammers include different aspects or features of the invention. The features in one embodiment can be used with features of another embodiment. The examples given and the combination of features disclosed are not intended to be limiting in the sense that they must be used together.

The invention claimed is:

1. A replaceable tip for a multi-piece hammer for a material reduction machine, the replaceable tip being mountable to a base on a driven roll, the replaceable tip comprising a leading surface facing forward to impact material to be reduced, a bottom surface facing outward and extending rearward from the leading surface, and a cavity opening to receive the base, the cavity including a front surface facing rearward opposite the leading surface and opposing side surfaces extending rearward from the front surface, at least one of the side surfaces including a rail or groove for receipt with a corresponding rail or groove on the base, wherein the rail or groove is inclined to extend rearward and outward away from the front surface.

2. The replaceable tip in accordance with claim 1, wherein the rail or groove includes bearing surfaces along opposite sides of the rail or groove to support the tip on the base during use.

3. The replaceable tip in accordance with claim 1, wherein the rail or groove is inclined between 35 and 65 degrees relative to the leading surface.

4. The replaceable tip in accordance with claim 1, wherein the rail or groove is inclined between 45 and 55 degrees relative to the leading surface.

5. The replaceable tip in accordance with claim 1, wherein the rail or groove is inclined 50 degrees relative to the leading surface.

6. The replaceable tip in accordance with claim 1, wherein the cavity has a width extending between the side surfaces and the rail or groove is a rail in one of the side surfaces that has a thickness that is approximately between one fifth and one half of the width of the cavity.

7. The replaceable tip in accordance with claim 6, wherein the width of the rail is between one forth and two fifths the width of the cavity.

8. The replaceable tip in accordance with claim 6, wherein the width of the rail is approximately one third the width of the cavity.

9. The replaceable tip in accordance with claim 1 including an opening for receiving a retainer to secure the tip to the base.

10. The replaceable tip in accordance with claim 9 wherein the opening is in the rail or groove.

11. The replaceable tip in accordance with claim 1 including an opening in at least one side surface, and a retainer having a collar with a threaded hole secured in the opening and a threaded pin threadedly received in the threaded hole.

12. The replaceable tip in accordance with claim 1 wherein the cavity includes a top end opposite the bottom surface and a rear end opposite the front surface, wherein the top end and the rear end are open to receive the base.

13. The replaceable tip in accordance with claim 1 wherein the at least one side surface includes the rail received in the groove on the base.

14. A hammer for a reduction machine, the hammer comprising:

a base including a first end for mounting the base to a driven roll of the reduction machine, a second end opposite the first end, a groove or rail on the second end, and an opening;

a replaceable tip including a leading surface facing forward to impact material to be reduced, a bottom surface facing outward and extending rearward from the leading surface, a cavity opening to receive the base, and an opening that aligns with the opening on the base when the replaceable tip is mounted on the base, the cavity including a front surface facing rearward opposite the leading surface and opposing side surfaces extending rearward from the front surface, at least one of the side surfaces including a rail or groove for receipt with a corresponding rail or groove on the base, wherein the rail or groove is inclined to extend rearward and outward away from the front surface; and a retainer inserted into the opening in the base and the opening in the replaceable tip to secure the replaceable tip to the base.

15. The replaceable tip in accordance with claim 14 wherein the retainer includes a collar with a threaded hole secured in the opening and a threaded pin threadedly received in the threaded hole.

16. The replaceable tip in accordance with claim 14 wherein the opening is in the rail or groove.

* * * * *